(12) United States Patent
Jadhav et al.

(10) Patent No.: US 12,495,741 B2
(45) Date of Patent: Dec. 16, 2025

(54) HARVESTING MACHINE BELT PICKUP HEADER WITH MOVABLE PICKUP BELT ASSEMBLY

(71) Applicant: Deere & Company, Moline, IL (US)

(72) Inventors: Snehalrao Jadhav, Satara (IN); Glenn E. Pope, Viola, IL (US); Aaron S. Ritter, Milan, IL (US); Duane M. Bomleny, Geneseo, IL (US); Bradley K. Yanke, Eldridge, IA (US); Aniruddha Patankar, Pune (IN)

(73) Assignee: DEERE & COMPANY, Moline, IL (US)

( * ) Notice: Subject to any disclaimer, the term of this patent is extended or adjusted under 35 U.S.C. 154(b) by 1040 days.

(21) Appl. No.: 17/513,168

(22) Filed: Oct. 28, 2021

(65) Prior Publication Data

US 2023/0136518 A1 May 4, 2023

(51) Int. Cl.
*A01D 89/00* (2006.01)
*A01D 41/10* (2006.01)
(Continued)

(52) U.S. Cl.
CPC ........... *A01D 89/003* (2013.01); *A01D 41/10* (2013.01); *A01D 41/1274* (2013.01);
(Continued)

(58) Field of Classification Search
CPC .... A01D 89/00; A01D 89/001; A01D 89/003; A01D 41/10; A01D 41/00–41/16;
(Continued)

(56) References Cited

U.S. PATENT DOCUMENTS

| 3,566,595 A | * | 3/1971 | Milbrandt et al. ..... A01D 51/00 56/345 |
| 4,171,606 A | | 10/1979 | Ziegler et al. |

(Continued)

FOREIGN PATENT DOCUMENTS

| CA | 2904464 A1 | 3/2016 |
| CN | 210580089 U | 5/2020 |

(Continued)

*Primary Examiner* — Joseph M Rocca
*Assistant Examiner* — Madeline I Runco
(74) *Attorney, Agent, or Firm* — KLINTWORTH & ROZENBLAT LLP

(57) ABSTRACT

A header for an agricultural work vehicle including a feeder house is provided, with the header operable to move crop material in a forward feed direction during a crop processing operation and in a reverse feed direction during a declogging operation. The header includes a frame configured to be coupled to the feeder house, a pickup belt assembly coupled to the frame and including a movable pickup belt configured to convey crop material, a transfer belt assembly coupled to the frame and including a movable transfer belt arranged to convey crop material from the pickup belt assembly to the feeder house in the forward feed direction, an actuator coupled to the frame that pivots the pickup belt assembly relative to the frame, and a discharge zone through which crop material is conveyed in the reverse feed direction during the declogging operation.

17 Claims, 17 Drawing Sheets

(51) Int. Cl.
*A01D 41/127* (2006.01)
*A01D 57/20* (2006.01)
*A01D 61/00* (2006.01)
*A01D 75/18* (2006.01)

(52) U.S. Cl.
CPC ........... *A01D 57/20* (2013.01); *A01D 61/008* (2013.01); *A01D 75/182* (2013.01)

(58) Field of Classification Search
CPC .. A01D 41/1274; A01D 57/20; A01D 61/008; A01D 75/182
See application file for complete search history.

(56) References Cited

U.S. PATENT DOCUMENTS

| | | | | |
|---|---|---|---|---|
| 4,567,719 | A * | 2/1986 | Soots | A01D 41/10 56/364 |
| 4,942,724 | A | 7/1990 | Diekhans et al. | |
| 5,791,128 | A * | 8/1998 | Rogalsky | A01D 41/142 60/484 |
| 6,226,967 | B1 * | 5/2001 | Staiger | A01D 43/077 56/16.6 |
| 6,381,932 | B1 * | 5/2002 | Clauss | A01F 29/10 56/10.2 J |
| 7,555,882 | B2 * | 7/2009 | Clauss | A01D 69/005 56/10.2 G |
| 7,937,919 | B2 | 5/2011 | Coers et al. | |
| 8,272,199 | B2 | 9/2012 | Sauerwein et al. | |
| 9,144,197 | B2 * | 9/2015 | Gahres | A01D 41/14 |
| 9,554,515 | B1 * | 1/2017 | Hartman | A01D 41/1274 |
| 10,028,437 | B2 * | 7/2018 | Bomleny | A01D 41/16 |
| 11,304,370 | B2 * | 4/2022 | Trowbridge | A01D 75/187 |
| 11,497,165 | B2 * | 11/2022 | Ricketts | A01D 57/20 |
| 2004/0006958 | A1 | 1/2004 | Thiemann et al. | |
| 2006/0277889 | A1 | 12/2006 | Sheedy et al. | |
| 2007/0000226 | A1 | 1/2007 | Grywacheski et al. | |
| 2008/0058041 | A1 | 3/2008 | Phillips | |
| 2014/0041354 | A1 | 2/2014 | Coon et al. | |
| 2014/0290200 | A1 * | 10/2014 | Trowbridge | A01D 41/1274 56/11.2 |
| 2016/0183462 | A1 | 6/2016 | Magisson et al. | |
| 2017/0094906 | A1 * | 4/2017 | Bomleny | A01D 41/127 |
| 2019/0000015 | A1 | 1/2019 | Lauwers et al. | |
| 2019/0037771 | A1 | 2/2019 | Walker | |
| 2020/0128745 | A1 * | 4/2020 | Bueermann | A01D 57/20 |
| 2021/0120743 | A1 * | 4/2021 | Trowbridge | A01D 61/002 |
| 2023/0189714 | A1 * | 6/2023 | Jadhav | A01D 61/008 56/364 |

FOREIGN PATENT DOCUMENTS

| | | |
|---|---|---|
| DE | 102009017400 A1 | 10/2020 |
| FR | 2776469 A1 | 5/2000 |
| WO | 2012146580 A1 | 11/2012 |

* cited by examiner

HARVESTING MACHINE BELT PICKUP HEADER WITH MOVABLE PICKUP BELT ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to embodiments of harvesting machine belt pickup headers that include a pickup belt and transfer belt arrangement that deliver cut crop to a feeder house.

BACKGROUND OF THE DISCLOSURE

An agricultural harvesting machine such as a combine includes a header and a feeder house which remove a crop material from a field, gather the crop material, and transport the crop material to a separator. The grain is cleaned and deposited in a grain tank. When the grain tank becomes full, an unloading auger positioned along a side of the combine during harvesting is moved to the unloading position in which the auger extends approximately perpendicular to the longitudinal axis of the combine. The combine drives alongside a vehicle, such as a semi-trailer or grain cart, into which the grain is to be unloaded and the unloading auger is actuated to discharge the grain into the vehicle.

For small-stemmed crops such as wheat, soybeans, etc., the combine typically carries and drives a cutting header that includes a cutter bar at the leading edge thereof. The crop is cut using the cutter bar and conveyed to the feeder house of the combine using conveying structures such as an overhead reel, draper belts, dual feed auger, etc.

For certain applications and operating environments, the crop is cut prior to full maturation and dry down and is allowed to dry in the field prior to being picked up and processed with a combine. Such crops may be arranged and allowed to dry in windrows, with the dried and windrowed crop being subsequently picked up using a pickup header carried by the combine. One type of known pickup header is a belt pickup header. A pickup header includes one or more belts that are carried by generally horizontally positioned drive and idler rollers. Typically, a combination of a pickup belt and a transfer belt are arranged to convey the crop material rearwardly to a feed auger and the feeder house of the combine. A plurality of fingers is provided on the pickup belt to draw the cut crop rearward along the rotating pickup belt and provide the crop to the transfer belt. The crop is moved from the pickup belt to the transfer belt where the crop is fed into the feed auger. The feed auger conveys the crop on to the feeder house.

SUMMARY OF THE DISCLOSURE

A header for an agricultural work vehicle including a feeder house is disclosed, with the header operable to move crop material in a forward feed direction during a crop processing operation and in a reverse feed direction during a declogging operation. The header includes a frame configured to be coupled to the feeder house, a pickup belt assembly coupled to the frame and including a movable pickup belt configured to convey crop material, a transfer belt assembly coupled to the frame and including a movable transfer belt arranged to convey crop material from the pickup belt assembly to the feeder house in the forward feed direction, an actuator coupled to the frame that pivots the pickup belt assembly relative to the frame, and a discharge zone through which crop material is conveyed in the reverse feed direction during the declogging operation.

An agricultural work vehicle is further disclosed that includes a feeder house operable to move crop material in a forward feed direction during a crop processing operation and in a reverse feed direction during a declogging operation. The agricultural work vehicle also includes a header having a frame configured to be coupled to the feeder house, a pickup belt assembly coupled to the frame and including a movable pickup belt configured to convey crop material, a transfer belt assembly coupled to the frame and including a movable transfer belt arranged to convey crop material from the pickup belt assembly to the feeder house, an actuator coupled to the frame that pivots the pickup belt assembly relative to the frame, and a discharge zone through which crop material is conveyed from the feeder house in the reverse feed direction during the declogging operation.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present disclosure, as set-forth the appended claims.

Figure 1:
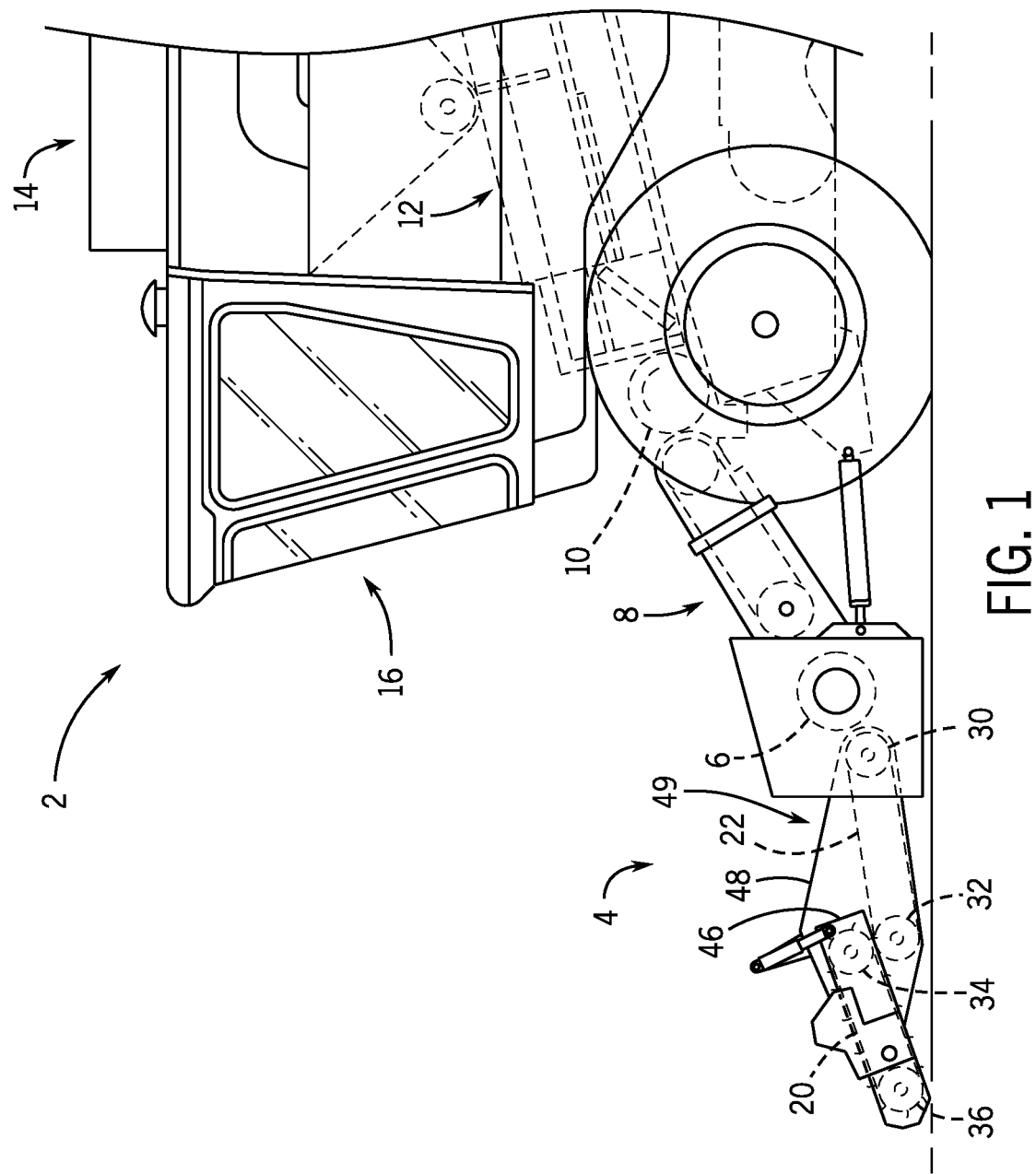
FIG. 1 is a side view of an agricultural harvesting machine that incorporates elements of the present disclosure, in accordance with an example embodiment.

Referring now to the drawings, FIG. 1 illustrates a self-propelled harvesting machine in the form of a combine 2, with which embodiments of the present disclosure may be employed. On the forward end area of the combine 2 is a belt pickup header 4 that is couplable with the combine 2 such as by using one or more drive shafts, hydraulic hoses, etc. Crop material, including grain crop material and non-grain crop material, is picked up from a field using the belt pickup header 4, and the belt pickup header 4 operates to convey the crop material rearwardly to an auger 6 (which, in some embodiments, is a dual feed auger) and feeder house 8 of the combine 2. The cut crop is funneled through the feeder house 8 and proceeds upward and rearward to a drum conveyor 10, which then conveys the cut crop into a threshing and separating system 12 where grain in the cut crop material is threshed and separated from the material other than grain. A further conveyor (not shown) carries the now-clean grain upward into a grain tank 14 in the agricultural combine 2 from where grain can be periodically transferred to a vehicle (not shown) traveling along a side of the agricultural combine 2.

An operator's cabin 16 is disposed above and behind the belt pickup header 4. The operator's cabin 16 has an operator seat and several operator controls to permit the operator to operate the agricultural combine 2 and the belt pickup header 4.

Figure 2:
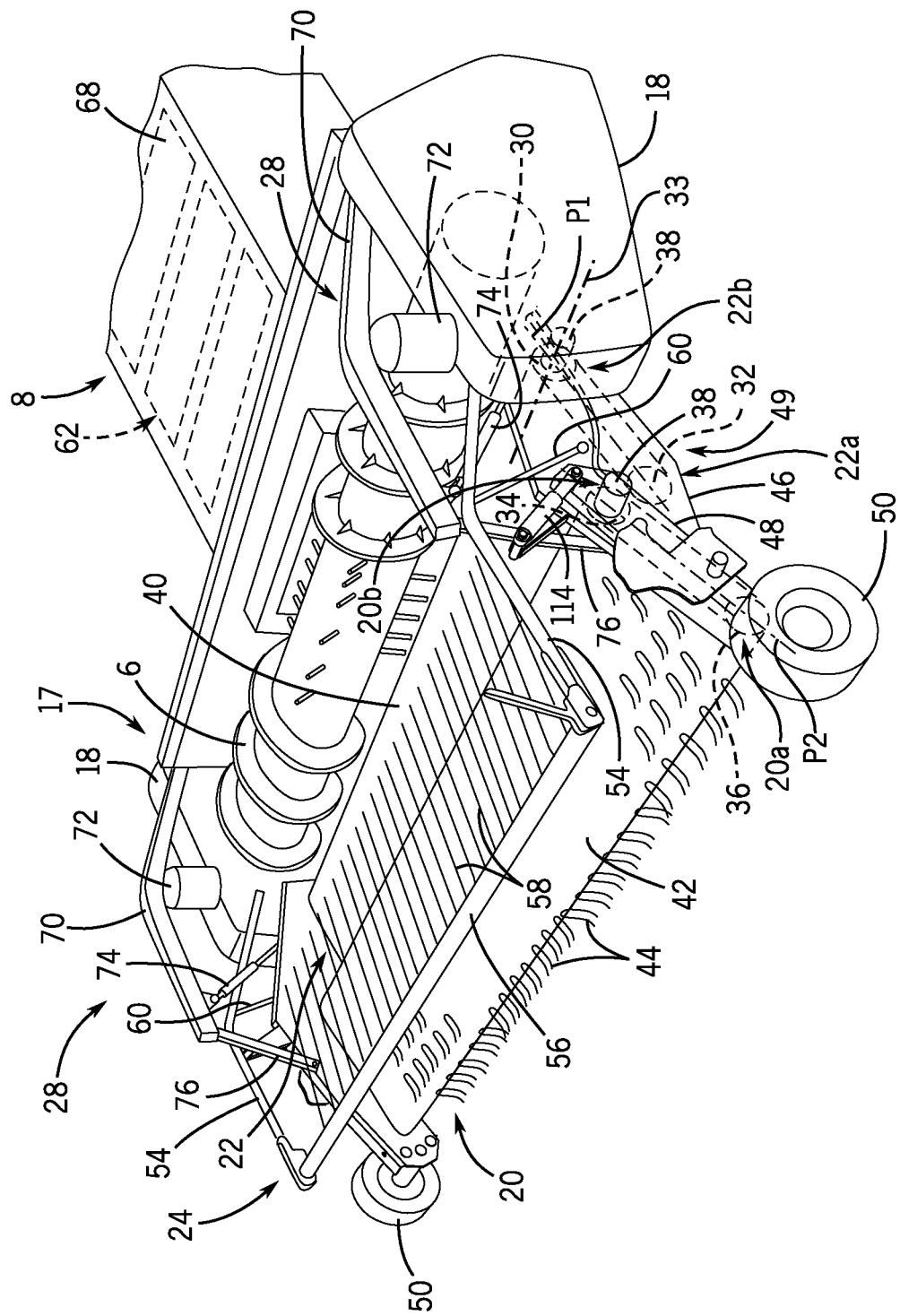
FIG. 2 is a front perspective view of a belt pickup header and feeder house included in the harvesting machine of FIG. 1, in accordance with an example embodiment.
Figure 3:
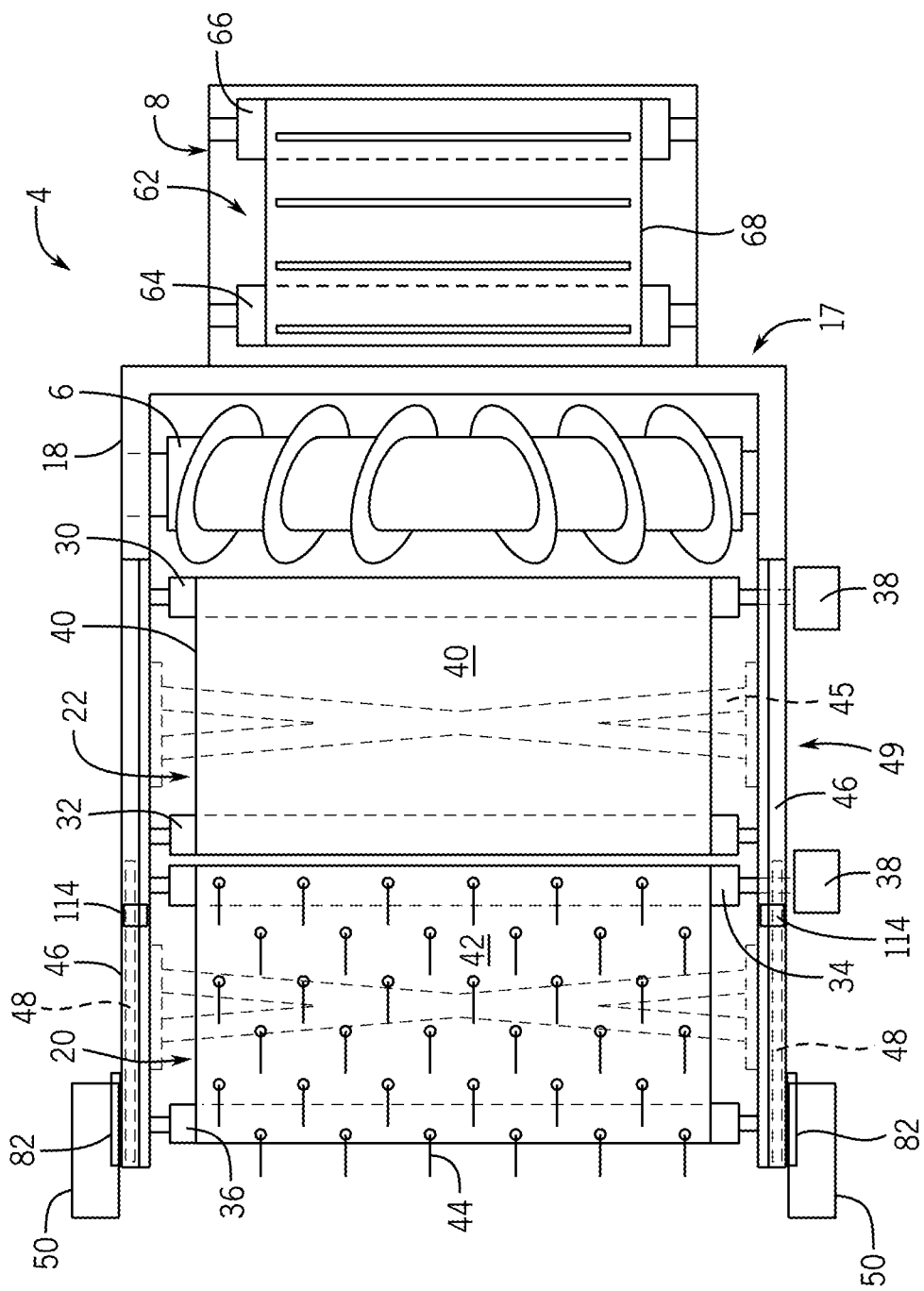
FIG. 3 is a schematic plan view of the belt pickup header and feeder house of FIG. 2, with some features removed for clarity.

FIGS. 2 and 3 show features of the belt pickup header 4 in greater detail, according to one example embodiment. The belt pickup header 4 generally includes a main frame 17 having a pair of frame ends 18, a pickup belt assembly 20, a transfer belt assembly 22, a windscreen 24 (also known as a crop hold-down), an auger 6, and a suspension system 28.

The transfer belt assembly 22 includes a drive roller 30 and a driven roller 32. The drive roller 30 also defines the axis of pivotal coupling 33 between the transfer belt assembly 22 and the main frame 17. Similarly, the pickup belt assembly 20 includes a drive roller 34 and a driven roller 36. As shown in FIG. 2, the drive roller 30 and drive roller 34 are respectively driven by a pair of motors 38 that operate to drive the transfer belt assembly 22 and the pickup belt assembly 20 at the same rotational speed. In the illustrated embodiment, the motors 38 are provided as hydraulic motors which are coupled together in series, but it is recognized that the motors 38 could instead be other types of motive devices, such as electric motors (e.g., servo motors). The transfer belt assembly 22 also includes an endless belt 40 wrapped about the rollers 30, 32. In the illustrated example, the endless belt 40 is smooth. In other instances, the endless belt 40 includes cleats for conveying the crop material toward the combine 2. The pickup belt assembly 20 includes an endless belt 42 carrying a plurality of fingers 44 for effectively removing the crop material from the field and assisting in moving the crop back to the transfer belt assembly 22. With the belt pickup header 4 conventionally positioned on the combine 2 relative to the ground, the transfer belt assembly 22 extends along a plane P1 at an angular orientation in which a forward end 22a of the transfer belt assembly 22 is lower (i.e., closer to the ground) than a rearward end 22b of the transfer belt assembly 22, while the pickup belt assembly 20 extends along a plane P2, which intersects the plane P1 of the pickup belt assembly 22, at an angular orientation in which a forward end 20a of the pickup belt assembly 20 is lower (i.e., closer to the ground) than a rearward end 20b of the pickup belt assembly 20. Thus, in this arrangement, the pickup belt assembly 20 is positioned relative to the transfer belt assembly 22 such that a position of the rearward end 20b of the pickup belt assembly 20 overlaps with a position of the forward end 22a of the transfer belt assembly 22, with the rearward end 20b of the pickup belt assembly 20 positioned above the forward end 22a of the transfer belt assembly 22.

When harvesting crop material, the transfer belt assembly 22 and the pickup belt assembly 20 are each provided in a harvesting position and at an angular orientation where a forward end or side thereof is lower than a rearward end or side (i.e., a forward end 20a of the pickup belt assembly 20 is lower, relative to the ground, than a rearward end 20b of the pickup belt assembly 20 and a forward end 22a of the transfer belt assembly 22 is lower, relative to the ground, than a rearward end 22b of the transfer belt assembly 22), to aid in moving the crop back toward the feeder house 8.

The pickup belt assembly 20 and transfer belt assembly 22 are secured to side sheets 46 and intermediate brackets 48 that collectively define side frames 49 that support the pickup belt assembly 20 and transfer belt assembly 22 and carry the drive rollers 30 and 34 and driven rollers 32 and 36. The side sheets 46 are coupled to the frame ends 18 of the main frame 17. For securing the pickup belt assembly 20 and transfer belt assembly 22 to the side sheets 46 and intermediate brackets 48, a cross frame 45 (FIG. 3) is included in each of the transfer belt assembly 22 and pickup belt assembly 20 to provide stability thereto. The cross frames 45 are affixed to the side sheets 46 and intermediate brackets 48, while the drive rollers 30 and 34 and driven rollers 32 and 36 are mounted within openings in the side sheets 46 and intermediate brackets 48 in a manner that still provides for rotation of the rollers 30, 32, 34, 36 about their respective rotational axes. Additionally, the side sheets 46 carry a pair of gauge wheels 50 positioned forward and outside of the pickup belt assembly 20.

The windscreen 24 includes a pair of arms 54 interconnected by a cross bar 56. The cross bar 56 carries a plurality of rearwardly extending tines 58. An angular orientation of the tines 58 may be adjusted by adjusting an attachment orientation between the cross bar 56 and arms 54. A pair of hydraulic cylinders 60 interconnect the arms 54 with the side sheets 46 of the transfer belt assembly 22. The vertical height of the cross bar 56 and the tines 58 may be adjusted by an operator through actuation of the hydraulic cylinders 60. By connecting the lower end of the hydraulic cylinders 60 with the side sheets 46, the cross bar 56 moves up and down with the pickup belt assembly 20 to provide a clearance distance therebetween for rearward conveying of crop material.

The auger 6 receives the crop material conveyed rearwardly by the transfer belt assembly 22 and moves the crop material inward from each side of the belt pickup header 4 toward the feeder house 8. Within the feeder house 8, a belt conveyor 62 operates to convey the crop material into the combine 2, such as to a threshing area in the combine 2. The belt conveyor 62 may include an idler roller 64 and a drive roller 66 supported at the sidewalls of the feeder house 8, along with an endless belt 68. In some instances, the endless belt 68 includes two endless chains to which laterally extending slats are fixed and which are driven by the drive roller 66.

The suspension system 28 generally includes a pair of suspension arms 70, a pair of compression springs 72, and a pair of fluid shocks 74 (e.g., hydraulic shocks) that dampen movement between the suspension arms 70 and the main frame 17. Each suspension arm 70 has a proximal end closest to the combine 2 that is pivotally coupled with the main frame 17 at the opposite lateral sides of the belt pickup header 4. Each suspension arm 70 has a distal end that is coupled with a side sheet 46 at each lateral side of the pickup belt assembly 20. In the embodiment shown, each suspension arm 70 has a distal end which is coupled with a respective side sheet 46 by way of a corresponding suspension link 76 in a manner allowing free pivotal movement therebetween. Alternatively, in other instances, each suspension arm 70 is angled downwardly for direct connection with the trailing edge of the pickup belt assembly 20 or the leading edge of the transfer belt assembly 22.

In operation of the belt pickup header 4, it is recognized that crop material removed from the field by the pickup belt assembly 20 and transferred back to the feeder house 8 via the transfer belt assembly 22 and auger 6 can occasionally lead to a clogging of crop material in the feeder house 8 or in the auger 6. When such a clog occurs, the belt conveyor 62 in the feeder house 8 and the auger 6 may operate in reverse to attempt to clear the clogged crop material from the feeder house 8. Removal of the clogged crop material from the feeder house 8 is further improved via operation of the pickup belt assembly 20, the transfer belt assembly 22, or both, in a reverse mode, according to embodiments of the present disclosure. In order to facilitate operation of the pickup belt assembly 20, the transfer belt assembly 22, or both, in a reverse mode, the belt pickup header 4 is constructed to provide for selective rotation or movement of the pickup belt assembly 20 relative to the transfer belt assembly 22, providing a clearance gap between the fingers 44 of the pickup belt assembly 20 and the belt 40 of the transfer belt assembly 22.

Referring now to FIGS. 4-7, detailed views of the side sheets 46 and intermediate brackets 48 of the belt pickup header 4 are shown, along with coupling of the pickup belt assembly 20 and transfer belt assembly 22 to the side sheets 46 and intermediate brackets 48, according to one implementation. As will be explained in greater detail below, the coupling of the pickup belt assembly 20 to the side sheets 46 and intermediate brackets 48 provides for a rotational repositioning of the pickup belt assembly 20 relative to the transfer belt assembly 22.

Figure 4:
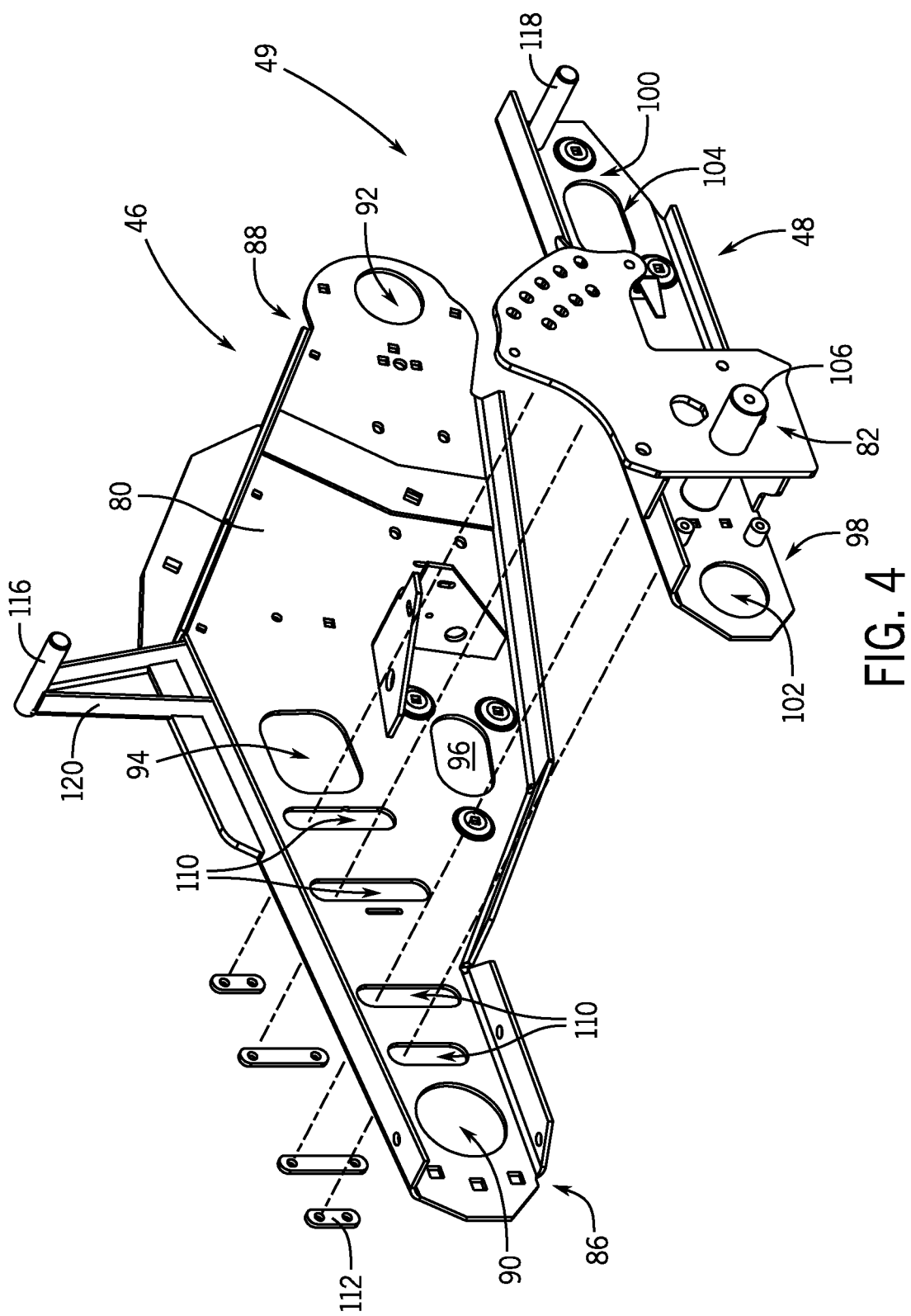
FIG. 4 is an exploded view of an assembly of a side sheet and an intermediate bracket provided on one side of the belt pickup header of FIG. 2, in accordance with an example embodiment.

Referring first to FIG. 4, the structure of a side sheet 46 and intermediate bracket 48 are shown in greater detail. The side sheet 46 generally includes a fixed portion 80 and a movable portion 82 that is spaced apart from the fixed portion 80, with the fixed portion 80 coupled to the main frame 17 (such as via a pivot fixture 84, shown in FIG. 5) and the movable portion 82 coupled to the intermediate bracket 48 in an arrangement that positions the intermediate bracket 48 between the fixed and movable portions 80, 82.

The fixed portion 80 of the side sheet 46 includes a forward arm 86 and rear arm 88 formed on opposing ends of thereof. The forward arm 86 and rear arm 88 include a roller opening 90, 92, respectively, formed therein that receives a respective roller of the pickup belt assembly 20 and transfer belt assembly 22. In particular, the roller opening 90 in the forward arm 86 receives the driven roller 36 of the pickup belt assembly 20, while the roller opening 92 in the rear arm 88 receives the drive roller 30 of the transfer belt assembly 22. Additional roller openings 94, 96 are also formed in the fixed portion 80 at locations between the front and rear arms 86, 88, with these roller openings 94, 96 generally aligned with one another vertically. The roller opening 94 receives the drive roller 34 of the pickup belt assembly 20 while the roller opening 96 receives the driven roller 32 of the transfer belt assembly 22. The positioning of the roller openings 94, 96 in this arrangement results in a vertical staggering and a horizontal overlap of the pickup belt assembly 20 and transfer belt assembly 22, such that harvested crop material is passed from the pickup belt assembly 20 to the transfer belt assembly 22 during normal operation.

The intermediate bracket 48 is positioned on an outward facing surface of the fixed portion 80 of the side sheet 46 (opposite from the pickup belt assembly 20 and transfer belt assembly 22) so that the intermediate bracket 48 is in between the fixed and movable portions 80, 82 of the side sheet 46. The intermediate bracket 48 is generally positioned to overlap with the forward arm 86 of the fixed portion 80 of the side sheet 46. The intermediate bracket 48 includes a front arm 98 and a back arm 100 having a roller opening 102, 104 formed respectively therein that receives a respective roller of the pickup belt assembly 20. The front arm 98 of the intermediate bracket 48 is positioned relative to the fixed portion 80 such that the roller opening 102 in the front arm 98 (of intermediate bracket 48) is aligned with the roller opening 90 in the forward arm 86 (of fixed portion 80) and such that the driven roller 36 of the pickup belt assembly 20 is receivable into both the roller openings 90, 102. Similarly, the back arm 100 of the intermediate bracket 48 is positioned relative to the fixed portion 80 of the side sheet 46 such that the roller opening 104 in the back arm 100 (of intermediate bracket 48) is aligned with the roller opening 94 in the fixed portion 80 and such that the drive roller 34 of the pickup belt assembly 20 is receivable into both the roller openings 94, 104. Regarding the aligned roller opening 94 formed in the fixed portion 80 of the side sheet 46 and the roller opening 104 formed in the back arm 100 of the intermediate bracket 48, the roller opening 104 in the back arm 100 is smaller than that of the roller opening 94 in the side sheet 46 such that the drive roller 34 is secured within the roller opening 104 but that there is a clearance between the drive roller 34 and the side sheet 46 that allows for movement of the roller 34 relative to the side sheet 46, as will be explained later.

The intermediate bracket 48 also includes a wheel mount 106 that extends in a laterally outward direction. The wheel mount 106 extends through an opening in the movable portion 82 of the side sheet 46. One of the gauge wheels 50 (FIG. 2) of the belt pickup header 4 is mounted to the wheel mount 106. A gauge wheel arm (not shown) may be further secured to the movable portion 82 and, in some embodiments, the mating between the gauge wheel arm and the movable portion 82 allows for a positional adjustment between the gauge wheel 50 and the side sheet 46, such as adjustment between an upper, middle, or lower position that adjusts a height of the belt assemblies 20, 22 above the ground.

Each of the side sheet 46 and intermediate bracket 48 further include features thereon that provide for a relative movement between the intermediate bracket 48 and the side sheet 46 (i.e., the fixed portion 80 of the side sheet 46). The fixed portion 80 of the side sheet 46 includes a plurality of vertically oriented openings or slots 110 formed therein extending along a length of the forward arm 86, with four (4) such slots 110 shown in FIG. 4. Linearly shaped connecting plates 112 are positioned in these slots 110. The plates 112 couple the intermediate bracket 48 to the cross frame 45 of the pickup belt assembly 20. Each of the connecting plates 112 is configured to have a length that is less than a length of the respective slot 110 within which the connecting plate 112 is positioned to provide for movement of the connecting plates 112 within the slots 110 (i.e., an up/down sliding of the connecting plates 112 within the slots 110 in the context of FIG. 4).

Figure 5:
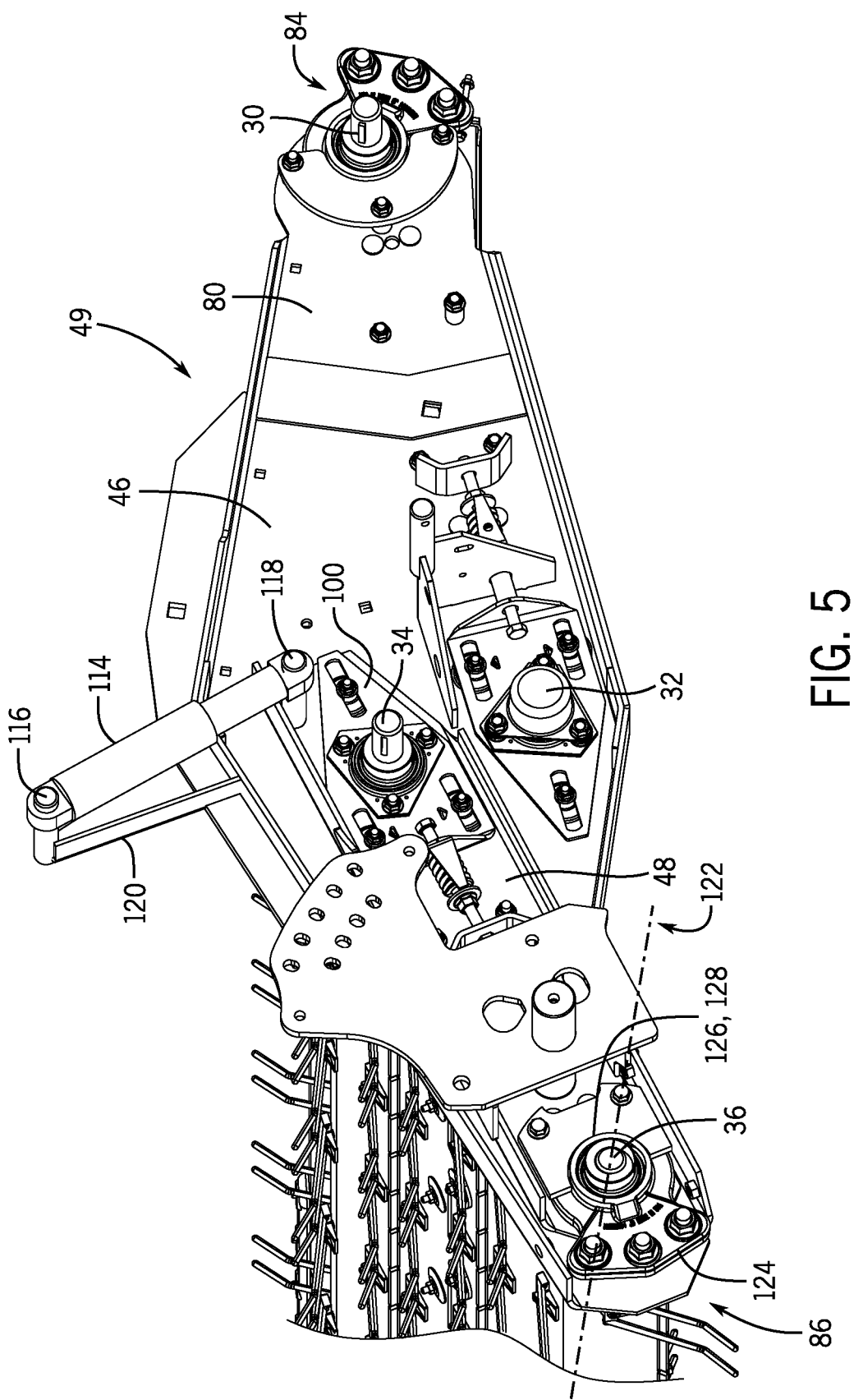
FIG. 5 is a perspective view of a portion of the belt pickup header of FIG. 2 illustrating coupling of the intermediate bracket to the side sheet.

As shown in FIG. 5, an actuator 114 is provided that enables movement of the intermediate bracket 48 relative to the fixed portion 80 of the side sheet 46. In the example implementation, the actuator 114 is in the form of a linear actuator, such as a hydraulic cylinder coupled between the intermediate bracket 48 and side sheet 46. A length of the actuator 114 is adjustable. For example, in the context of a hydraulic cylinder, the length of the actuator 114 is adjustable in response to changes in hydraulic pressure. A change in length of the actuator 114 causes movement of the intermediate bracket 48 relative to the side sheet 46. Other types of actuators, such as an actuator that includes an electric motor, could alternatively be used to move the intermediate bracket 48 relative to the side sheet 46.

In the illustrated embodiment, mounts 116, 118 to which the actuator 114 is mounted are provided on the side sheet 46 and the intermediate bracket 48, respectively. In the illustrated embodiment, the mounts 116, 118 are provided as cylindrically shaped protrusions, although it is recognized that other mounting features may be used. The mount 116 on the fixed portion 80 of the side sheet 46 is positioned on the distal end of an extension bracket 120 that extends upwardly from the fixed portion 80. The mount 118 on the intermediate bracket 48 is positioned on the back arm 100 and in proximity to the extension bracket 120 on the fixed portion 80. One end of the actuator 114 is coupled to the mount 116 while the other end of the actuator 114 is coupled to the mount 118.

According to some embodiments, operation of the actuator 114 to adjust the length thereof causes a corresponding movement of the intermediate bracket 48 relative to the fixed portion 80 of the side sheet 46. More specifically, a shortening or lengthening of the actuator 114 causes rotation of the intermediate bracket 48 about a pivot axis 122 provided between the intermediate bracket 48 and the fixed portion 80. In the illustrated embodiment, the pivot axis 122 is provided at the location of the driven roller 36 of the pickup belt assembly 20, although it is recognized that another pivot axis could be selected about which the intermediate bracket 48 rotates relative to the side sheet fixed portion 80, such as at a location vertically offset from the location of driven roller 36. At the location of the pivot axis 122, a pivot fixture 124 is provided that enables rotation of the intermediate bracket 48 relative to the fixed portion 80. The pivot fixture 124 is secured to the forward arm 86 of the fixed portion 80 (such as via a plurality of fasteners) and includes a roller mount 126 therein that receives and secures the roller 36 therein in a manner that provides for rotation of the roller 36 relative to the pivot fixture 124 (e.g., via a roller bearing attachment (not shown)). The roller mount 126 includes a roller opening 128 that receives the roller 36, with the roller opening 128 of the roller mount 126 being aligned with the roller openings 90, 102 formed in the side sheet 46 and intermediate bracket 48, respectively.

Figure 6:
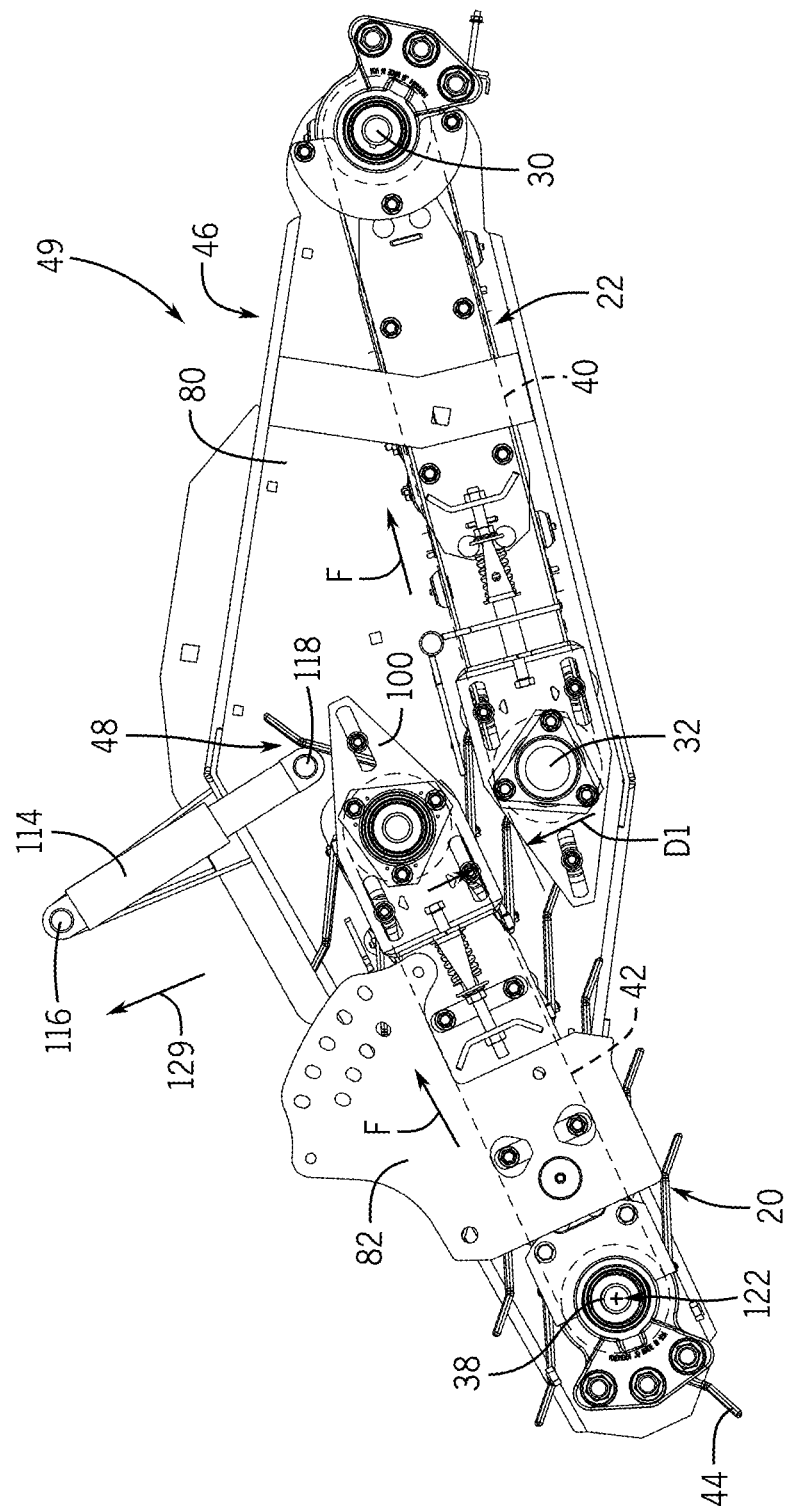
FIG. 6 is a side view of a portion of the belt pickup header of FIG. 2 illustrating positioning of a pickup belt assembly relative to a transfer belt assembly while in a normal operating mode.

An example of the movement of the intermediate bracket 48 will now be described here below with reference to FIGS. 6 and 7 and with continued reference to FIGS. 4 and 5. According to the example, the actuator 114 is movable between an extended position and a retracted position. In embodiments where the actuator 114 is a hydraulic cylinder, the hydraulic cylinder is movable between the extended and retracted positions via operation of a hydraulic circuit, such as a hydraulic circuit included within a belt pickup header (such as belt pickup header 4) or a combine (such as the combine 2). In FIG. 6, the actuator 114 is in an extended condition. As the actuator 114 is retracted, a length of the actuator 114 decreases, causing the back arm 100 of the intermediate bracket 48 (where actuator 114 is coupled to mount 118) to move upwardly in the direction of arrow 129. This upward movement of the back arm 100 causes the intermediate bracket 48 to rotate (counterclockwise) about the pivot axis 122 and also causes the connecting plates 112 to slide upwardly within the slots 110 formed in the side sheet fixed portion 80. The rotation of the intermediate bracket 48 can continue until the actuator 114 is fully retracted or until the connecting plates 112 contact the upper edge of the slots 110. In some embodiments, the intermediate bracket 48 is rotatable relative to the fixed portion 80 of the side sheet 46 by 5° from a first position in which the actuator 114 is fully extended to a second position in which with the actuator 114 is fully retracted.

As previously indicated, the pickup belt assembly 20 and transfer belt assembly 22 are coupled to the side sheets 46 and intermediate brackets 48 of the belt pickup header 4. The transfer belt assembly 22 is coupled to the fixed portion 80 of the side sheet 46 via coupling of the drive roller 30 and driven roller 32 within the roller openings 92, 96 and via coupling of the cross frame 45 to the fixed portion 80. The pickup belt assembly 20 is coupled to the intermediate bracket 48 via coupling of the drive roller 34 within the roller openings 94, 104 and the driven roller 36 within the roller openings 90, 102 and via coupling of the cross frame 45 (and connecting plates 112) to the intermediate bracket 48. The transfer belt assembly 22 is maintained in a fixed position relative to the fixed portion 80 of the side sheet 46, while allowing for rotation of the rollers 30, 32 via mounting thereof within the roller openings 92, 96, such as with a rotatable bearing coupling. Conversely, the pickup belt assembly 20 is movable relative to the fixed portion 80 of the side sheet 46 and, thus, relative to the transfer belt assembly 22 via coupling of the pickup belt assembly 20 to the intermediate bracket 48. As indicated above, the intermediate bracket 48 is rotatable and repositionable relative to the fixed portion 80 of the side sheet 46 via actuation of the actuator 114 that couples the intermediate bracket 48 and fixed portion 80. The rotation and repositioning of the intermediate bracket 48 causes a corresponding rotation and repositioning of the pickup belt assembly 20 that is coupled to the intermediate bracket 48.

Figure 7:
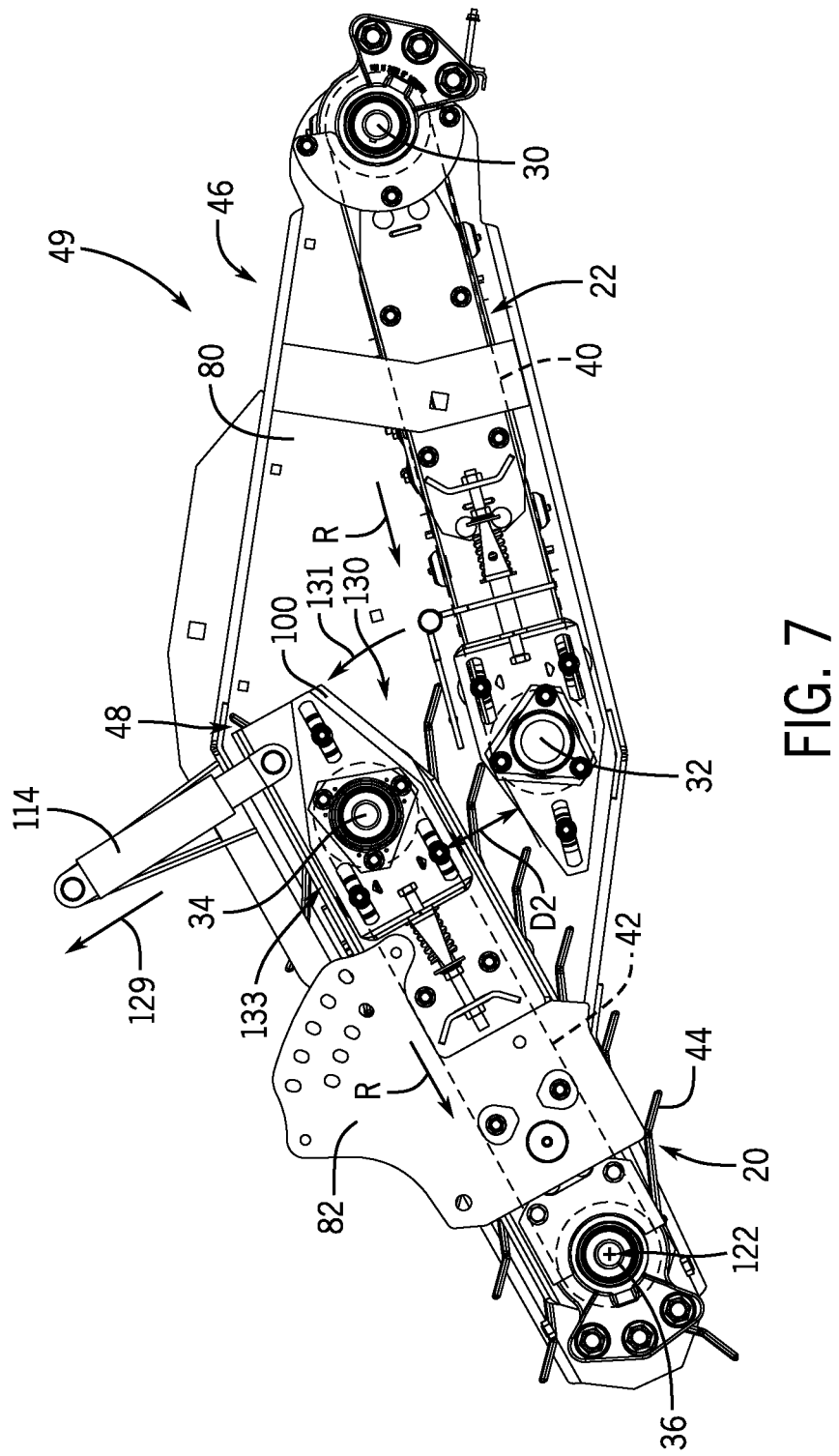
FIG. 7 is a side view of a portion of the belt pickup header of FIG. 2 illustrating positioning of a pickup belt assembly relative to a transfer belt assembly while in a reverse operating mode.

As best shown in FIGS. 6 and 7, the rotation and repositioning of the pickup belt assembly 20 relative to the fixed portion 80 of the side sheet 46 (and, hence, the transfer belt assembly 22) allows for a distance between the pickup belt assembly 20 and transfer belt assembly 22 to be altered. By selectively altering the distance between the pickup belt assembly 20 and transfer belt assembly 22, operation of the assemblies 20, 22 in multiple operational modes, e.g., a normal harvesting mode and a reverse declogging mode, is provided. FIG. 6 illustrates the belt assemblies 20, 22 in a normal harvesting position, with the actuator 114 in a fully extended position and the belt assemblies 20, 22 angled and arranged relative to one another to space the pickup belt assembly 20 apart from the transfer belt assembly 22 by a distance D1. The separation distance D1 allows for rotation of the belts 40, 42 in a forward rotational direction F (clockwise in FIG. 6) that moves crop material from the belts 40, 42 of the assemblies 22 and 20, respectively, to the auger 6 and feeder house 8. FIG. 7 illustrates the belt assemblies 20, 22 in a declogging position, with the actuator 114 in a retracted position and the pickup belt assembly 20 rotated and separated away from the transfer belt assembly 22 by a distance D2 that creates a clearance gap 130. Creation of the clearance gap 130 allows for rotation of the belts 40, 42 in a reverse rotational direction R (counterclockwise in FIG. 7) to move crop material away from the auger 6 and feeder house 8. That is, the clearance gap 130 allows for rotation of the belts 40, 42 in a reverse rotational direction R without the fingers 44 on the belt 42 of the pickup belt assembly 20 interfering or colliding with the belt 40 of the transfer belt assembly 22. According to some embodiments, the pickup belt assembly 20 is rotated away (in direction 131) from the transfer belt assembly 22 by 5°, resulting in the belt 42 and the fingers 44 of the pickup belt assembly 20 being moved away from the belt 40 of the transfer belt assembly 22. In some instances, a 5° rotation of the pickup belt assembly 20 relative to the transfer belt assembly 22 corresponds to a distance D2 of 50 mm. In other instances, the amount of rotation of the pickup belt assembly 20 relative to the transfer belt assembly 22 and the distances D1 and D2 may vary based, for example, on a size or configuration of the pickup header, e.g., pickup header 4, or crop type.

With the pickup belt assembly 20 and transfer belt assembly 22 operating in the declogging mode, and with belts 40, 42 operating in the reverse rotational direction R, crop material is moved in a reverse feed direction away from the feeder house 8 and through a discharge zone 133 of the belt pickup header 4. The discharge zone 133 is a region or area defined by the belt assemblies 20, 22 through which crop material is conveyed in the reverse feed direction during the declogging operation. In the illustrated embodiment, with the belts 40, 42 operating in the reverse rotational direction R, the crop material is carried over the transfer belt 40 and is transferred onto and over the pickup belt 42, through a discharge zone 133 provided above the pickup belt 42. Discharge of crop material through the discharge zone 133 with operation of the pickup belt assembly 20 and transfer belt assembly 22 in the declogging mode can aid in resolving issues of crop material clogging in the feeder house 8.

Figure 8:
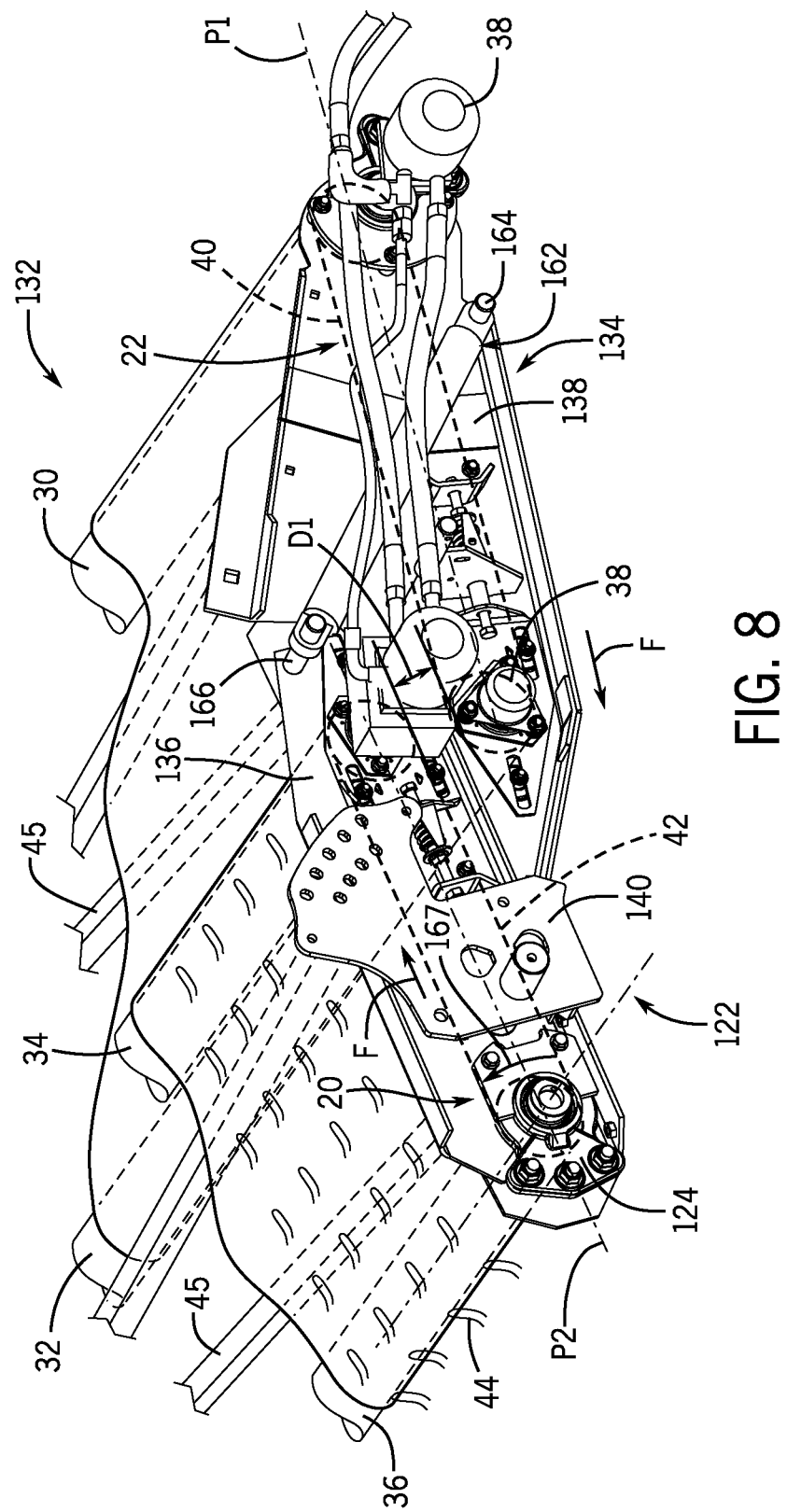
FIG. 8 is perspective view of a portion of a belt pickup header in accordance with another example embodiment, and illustrates positioning of a pickup belt assembly relative to a transfer belt assembly while in a normal operating mode.
Figure 9:
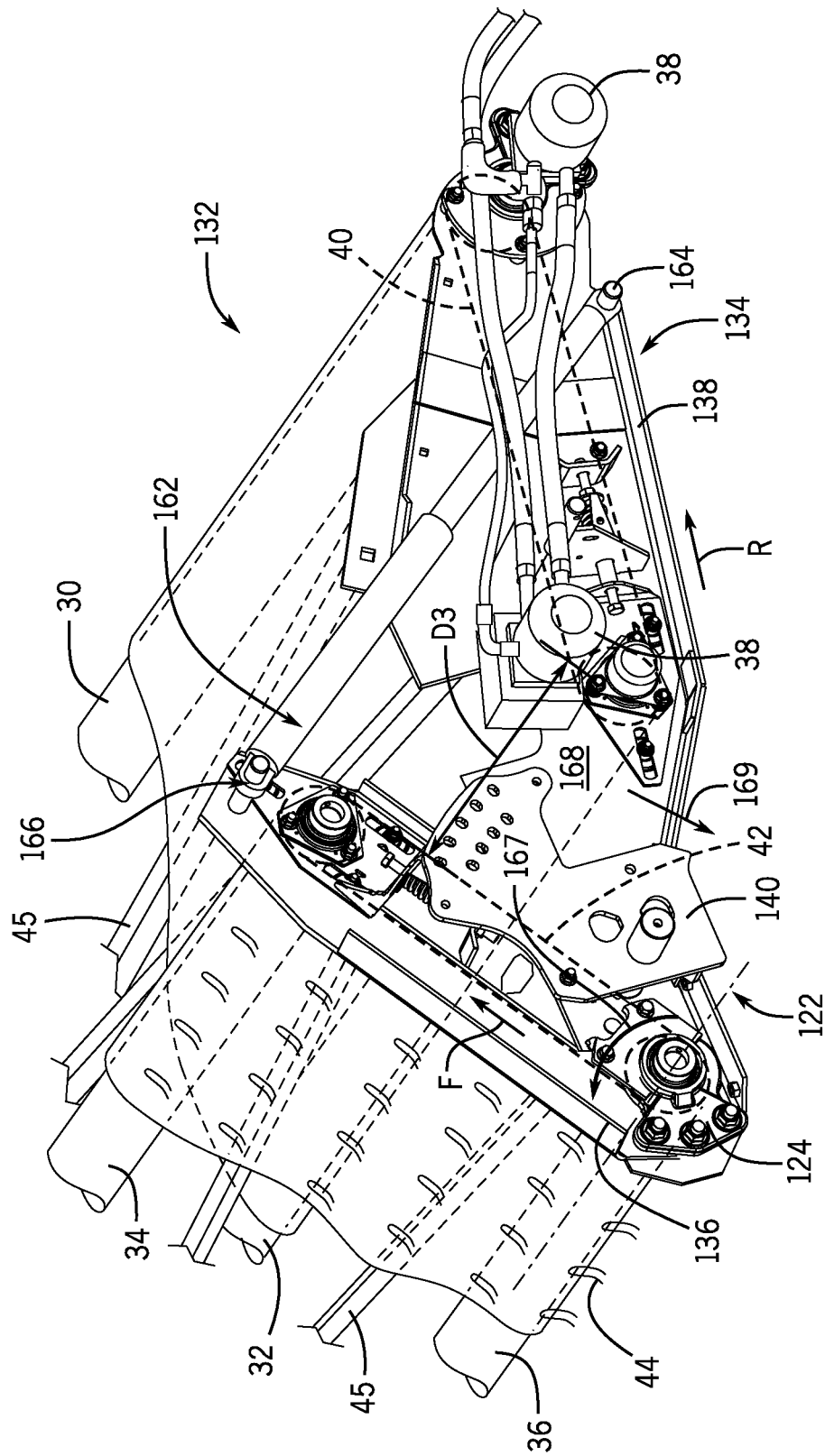
FIG. 9 is perspective view of the belt pickup header of FIG. 8 and illustrates positioning of the pickup belt assembly relative to the transfer belt assembly while in a feeder house declogging operating mode.
Figure 10:
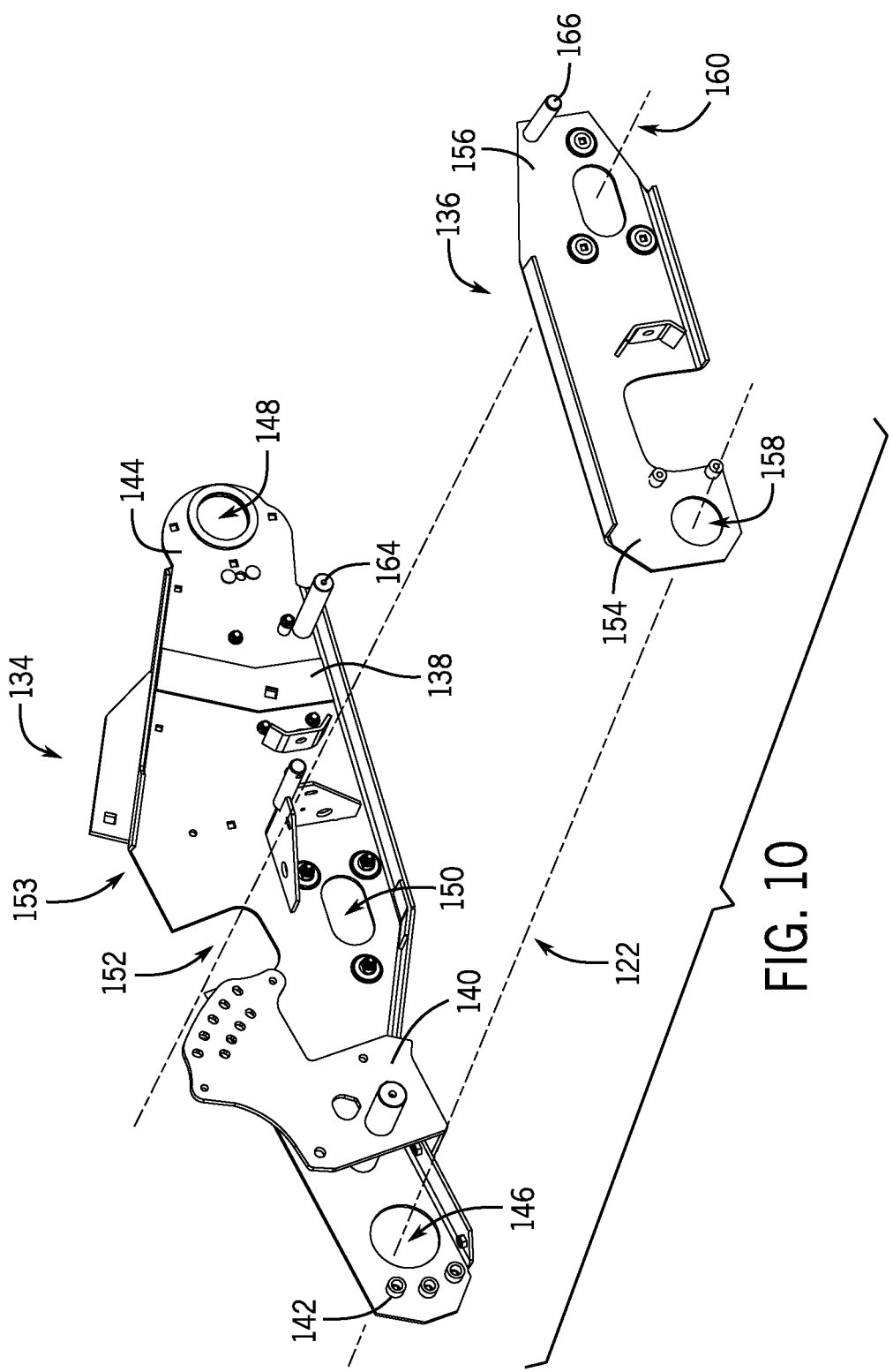
FIG. 10 is an exploded view of an assembly of a side sheet and an intermediate bracket provided on the belt pickup header of FIG. 8, in accordance with an example embodiment.

Referring now to FIGS. 8-10, portions of a belt pickup header 132 are shown that address the issue of crop material clogging in a feeder house according to another embodiment. The structure of the belt pickup header 132 is similar to that of belt pickup header 4 shown in FIGS. 2 and 3 and is coupled to the main frame in the same manner. However, belt pickup header 132 differs from belt pickup header 4 in the structure of the side sheets and intermediate brackets therein and the actuators (and arrangement thereof) for actuating the intermediate brackets relative to the side sheets that allow for relative movement between the pickup belt assembly 20 and transfer belt assembly 22.

Referring first to FIGS. 8 and 9, and as shown therein, the transfer belt assembly 22 of the belt pickup header 132 includes drive roller 30 and driven roller 32, while the pickup belt assembly 20 includes drive roller 34 and driven roller 36. The drive roller 30 and drive roller 34 are respectively driven by motors 38 (e.g., hydraulic motors) that drive the transfer belt assembly 22 and the pickup belt assembly 20. The transfer belt assembly 22 also includes belt 40 wrapped about the rollers 30, 32 and a cross frame 45. Similarly, the pickup belt assembly 20 includes belt 42 wrapped about the rollers 34, 36 and a cross frame 45. The belt 42 carries a plurality of fingers 44 that remove crop material from a field and assist in moving the crop material to the transfer belt assembly 22.

The belt pickup header 132 includes a side sheet 134 and intermediate bracket 136 that carry the drive and driven rollers 30, 32 and 34, 36 of the transfer belt assembly 22 and pickup belt assembly 20, respectively. As shown in FIGS. 8 and 9, the side sheet 134 generally includes an inner portion 138 and an outer portion 140, with the outer portion laterally offset from the inner portion 138 in an arrangement that provides for positioning of the intermediate bracket 136 between the inner and outer portions 138, 140, as shown, for example, in FIGS. 9 and 10.

As shown in FIG. 10, the inner portion 138 of the side sheet 134 includes a forward arm 142 and rear arm 144 formed on opposing ends of thereof. The forward arm 142 and rear arm 144 include a roller opening 146, 148, respectively, formed therein that receives a respective roller of the pickup belt assembly 20 and transfer belt assembly 22. In particular, the roller opening 146 in the forward arm 142 receives the driven roller 36 of the pickup belt assembly 20, while the roller opening 148 in the rear arm 144 receives the drive roller 30 of the transfer belt assembly 22. A roller opening 150 and a roller notch 152 are also formed in the inner portion 138 at locations between the front and rear arms 142, 144, with the opening 150 and notch 152 generally aligned with one another vertically. The notch 152 is open along a top edge 153 of the side sheet inner portion 138. The roller opening 150 receives the driven roller 32 of the transfer belt assembly 22, while the roller notch 152 receives the drive roller 34 of the pickup belt assembly 20. The positioning of the roller openings 146, 148, 150 and notch 152 in this arrangement results in a vertical staggering and a horizontal overlap of the pickup belt assembly 20 and transfer belt assembly 22, such that crop material that is moved rearward (i.e., towards a feeder house of a combine) by the pickup belt assembly 20 during normal operation is passed to the transfer belt assembly 22.

The intermediate bracket 136 is positioned adjacent an outward facing surface of the side sheet inner portion 138 (opposite from the pickup belt assembly 20 and transfer belt assembly 22) so that the intermediate bracket 136 is disposed between the inner and outer portions 138, 140 of the side sheet 134. The intermediate bracket 136 is positioned to overlap with the forward arm 142 of the inner portion 138. The intermediate bracket 136 includes a front arm 154 that includes a roller opening 158 and a back arm 156 that includes a roller opening 160. The roller openings 158, 160 receive a respective roller of the pickup belt assembly 20, i.e., roller opening 158 receives driven roller 36 and roller opening 160 receives drive roller 34. The front arm 154 of the intermediate bracket 136 is positioned relative to the inner portion 138 such that the roller opening 158 in the front arm 154 of intermediate bracket 136 is aligned with the roller opening 146 in the forward arm 142 of inner portion 138. Further, the inner portion 138 of the side sheet 134 and the intermediate bracket 136 are arranged such that the roller openings 146 and 158 are aligned to receive the driven roller 36 of the pickup belt assembly 20. Similarly, the back arm 156 is positioned relative to the inner portion 138 to align the roller opening 160 with the roller notch 152 and to allow for the drive roller 34 of the pickup belt assembly 20 to be received therein.

As shown in FIGS. 8 and 9, an actuator 162 is provided that enables movement of the intermediate bracket 136 relative to the side sheet 134. In the example embodiment, the actuator 162 is in the form of a linear actuator, such as a hydraulic cylinder coupled between the intermediate bracket 136 and side sheet 134. A length of the actuator 162 is adjustable. For example, in the context of a hydraulic cylinder, the length of the actuator 162 is adjustable in response to changes in hydraulic pressure. A change in length of the actuator 162 causes movement of the intermediate bracket 136 relative to the side sheet 134. Other types of actuators, such as an actuator that includes an electric motor, could alternatively be used to move the intermediate bracket 136 relative to the side sheet 134. Mounts 164, 166 are provided on the side sheet 134 and intermediate bracket 136, respectively, to which the actuator 162 is mounted. A first end of the actuator 162 is coupled to the mount 166 while a second end of the actuator 162 is coupled to the mount 164.

Adjusting of the length of the actuator 162 causes a corresponding movement of the intermediate bracket 136 relative to the side sheet 134. More specifically, a shortening or lengthening of the actuator 162 causes rotation of the intermediate bracket 136 about a pivot axis 122 located along the driven roller 36 of the pickup belt assembly 20. The intermediate bracket 136 pivots about the pivot axis 122 with the use of pivot fixtures 124. The pivot fixtures 124 are coupled to the intermediate bracket 136 and the inner portion 138 of the side sheet 134 and mounted concentrically with the openings 146 and 150 to provide for pivoting movement of the intermediate bracket 136 relative to the side sheet 134.

As the length of the actuator 162 increases, the intermediate bracket 136 pivots about pivot axis 122 in a direction of arrow 167. In some instances, rotation of the intermediate bracket 136 continues until the actuator 162 is fully extended. In some embodiments, the intermediate bracket 136 is rotatable relative to the side sheet 134 by 35°, such as between a first position in which the actuator 162 is in a fully retracted condition and a second position in which the actuator 162 is in a fully extended condition. Rotation of the intermediate bracket 136 relative to the side sheet 134 correspondingly results in rotation of the pickup belt assembly 20 relative to the transfer belt assembly 22.

As previously indicated, the pickup belt assembly 20 and transfer belt assembly 22 are coupled to the side sheet 134 and intermediate bracket 136 of the belt pickup header 132. The transfer belt assembly 22 is coupled to the inner portion 138 of side sheet 134 via coupling of the drive roller 30 and driven roller 32 within the roller openings 148, 150 (FIG. 10). The pickup belt assembly 20 is coupled to the intermediate bracket 136 via coupling of the drive roller 34 and driven roller 36 within the roller openings 158, 160. The transfer belt assembly 22 is maintained in fixed position relative to the side sheet 134, while allowing for rotation of the rollers 30, 32 via mounting thereof within the roller openings 148, 150, such as with the use of rotatable bearing couplings, for example. Conversely, the pickup belt assembly 20 is movable relative to the side sheet 134—and relative to the transfer belt assembly 22—via coupling of the pickup belt assembly 20 to the intermediate bracket 136. As indicated above, the intermediate bracket 136 is rotatable and repositionable relative to the side sheet 134 via actuation of the actuator 162. Rotation of the intermediate bracket 136 causes a corresponding rotation of the pickup belt assembly 20 coupled thereto.

As shown in FIGS. 8 and 9, rotation of the intermediate bracket 136 relative to the side sheet 134 alters a distance between the pickup belt assembly 20 and transfer belt assembly 22. By selectively altering the distance between the pickup belt assembly 20 and transfer belt assembly 22 (for example, from a distance D1 (FIG. 8) associated with the actuator 162 being fully retracted to a distance D3 (FIG. 9) associated with the actuator 162 being fully extended), a discharge zone 168 is formed therebetween. Crop material is dischargeable through the discharge zone 168, such as during operation of the feeder house belt conveyor 62, auger 6, and transfer belt assembly 22 in a declogging mode of operation. FIG. 8 illustrates the belt assemblies 20, 22 in a normal harvesting configuration, with the actuator 162 in a fully retracted position and the belt assemblies 20, 22 angled and arranged relative to one another to space the pickup belt assembly 20 apart from the transfer belt assembly 22 by a distance D1. The separation distance D1 allows the belts 40, 42 to rotate in a forward rotational direction F (clockwise in FIG. 8) without destructively interfering with each other. Further, rotation of the belts 40 and 42 in the direction F moves crop material from the pickup belt assembly 20, to transfer belt assembly 22, and to an auger and feeder house of a combine.

FIG. 9 illustrates the belt assemblies 20, 22 in a discharge configuration. In the discharge configuration, the pickup belt assembly 20 is pivoted about the pivot axis 122 in the direction of arrow 167 in response to extension of actuator 162, thereby increasing a separation between the pickup belt assembly 20 and the transfer belt assembly 22. In some instances, the actuator 162 is fully extended to define the discharge configuration. In the discharge configuration, a separation distance D3 is formed between the pickup belt assembly 20 and the transfer belt assembly 22. The separation therebetween allows crop material to be discharged through the discharge zone 168. According to some embodiments, the pickup belt assembly 20 is rotatable relative to the transfer belt assembly 22 by 35°. In other instances, an amount of relative rotation of the pickup belt assembly 20 relative to the transfer belt assembly 22 about the pivot axis 122 may be greater or less than 35°. Following formation of the discharge zone 168 in response to rotation of the pickup belt assembly 20 about the pivot axis 122 in the direction of arrow 167, the transfer belt assembly 22 can be operated in declogging mode to remove crop material from the belt pickup header 132. For example, in the declogging mode, the belt 40 is rotated in the reverse direction R, in conjunction with reverse operation of the feeder house belt conveyor 62 and auger 6, to direct crop material through the discharge zone 168, as indicated by arrow 169. Operating the belt pickup header 132 in this way removes crop material that may be forming a clog within the feeder house 8. In some embodiments, the belt 42 of pickup belt assembly 20 continues to rotate in the forward direction F while the transfer belt assembly 22, feeder house belt conveyor 62, and auger 6 operate in reverse (e.g., the belt 40 of the pickup belt assembly 22 rotates in the reverse direction R), to move crop material out through the discharge zone 168. When operating in the declogging mode, the belt pickup header 132 discharges crop material through the discharge zone 168, depositing the discharged crop material onto the ground underneath the pickup belt assembly 20.

Figure 11:
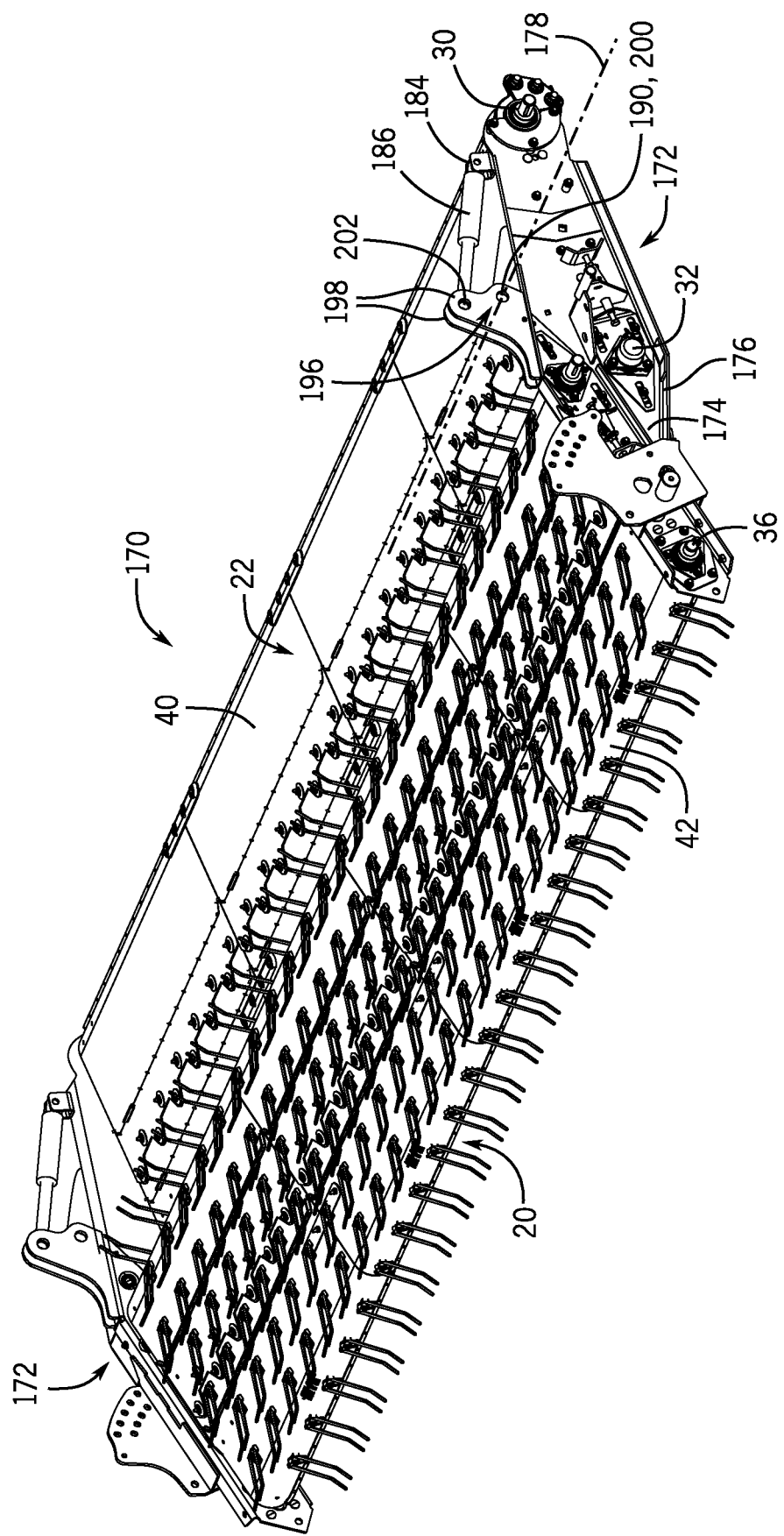
FIG. 11 is a front perspective view of a belt pickup header that includes a movable pickup belt assembly in the header, in accordance with another example embodiment.
Figure 12:
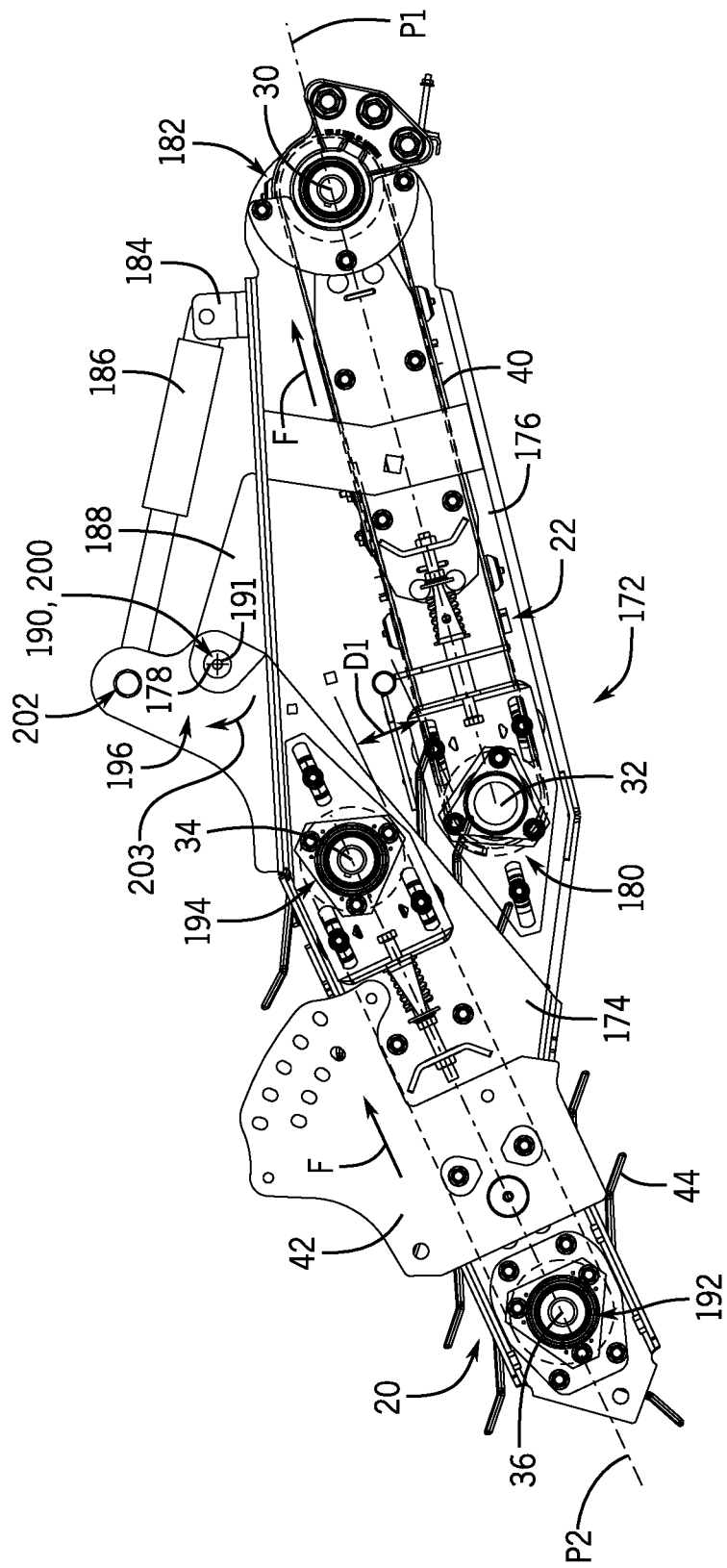
FIG. 12 is a side view of the belt pickup header of FIG. 11 illustrating positioning of a pickup belt assembly relative to a transfer belt assembly while in a normal operating mode.
Figure 13:
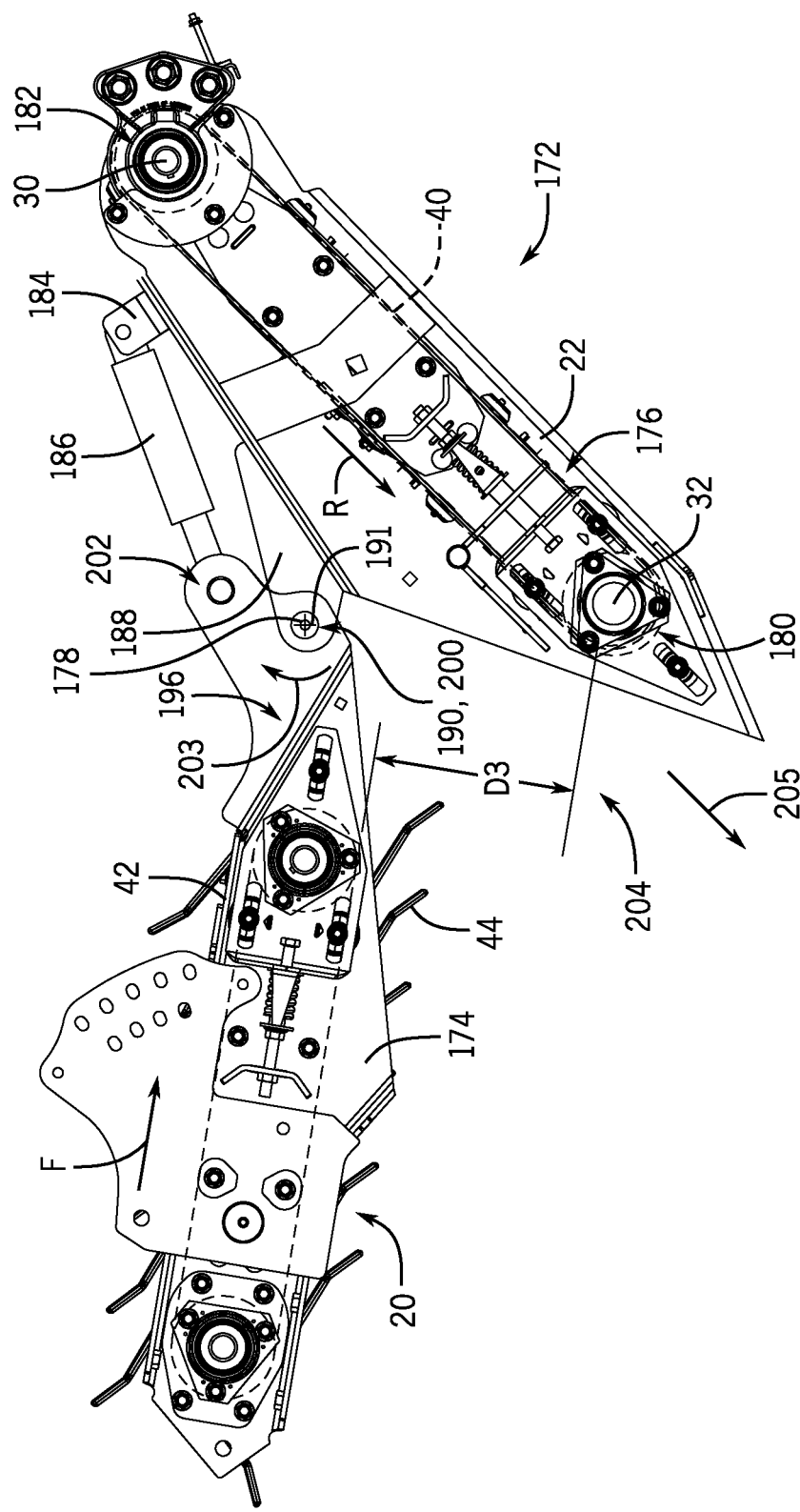
FIG. 13 is a side view of the belt pickup header of FIG. 11 illustrating positioning of a pickup belt assembly relative to a transfer belt assembly while in a feeder house declogging operating mode.

FIGS. 11 through 13 illustrate another example belt pickup header 170. The belt pickup header 170 includes a pickup belt assembly 20 and transfer belt assembly 22 that are moveable relative to each other to provide for the removal of crop material that may be forming an obstruction, such as a clog within a feeder house of a combine. In this embodiment, rather than a structure having an intermediate bracket and side sheet on each side of the header, the belt pickup header 170 includes a split slide sheet configuration to which the pickup belt assembly 20 and transfer belt assembly 22 are mounted. The belt pickup header 170 includes side sheets 172, and each side sheet 172 generally includes a front portion 174 and a back portion 176 that are split from each other as distinct portions. The front portion 174 and the back portion 176 are movable relative to each other as described below. The front portion 174 is separate from the back portion 176 except for being rotatably coupled thereto at a pivot axis location 178.

For each side sheet 172, the back portion 176 includes a roller opening 180 and a roller opening 182 formed therein. The roller opening receives 180 the driven roller 32 of the transfer belt assembly 22, while the roller opening 182 receives the drive roller 30 of the transfer belt assembly 22. Also included on the back portion 176 of the split side sheet 172 is a mount 184 that receives one end of an actuator 186 operable to rotate the front portion 174 relative to the back portion 176. A bracket 188 is also included on the back portion 176 that provides the pivot axis 178 between the front and back portions 174, 176 of the split side sheet 172. The bracket 188 includes an opening 190 formed therein through which a pivot pin 191 is received to rotatably connect the front portion 174 to the back portion 176. In the example embodiment, the actuator 186 is in the form of a linear actuator, such as a hydraulic cylinder that has an adjustable length. For example, in the context of a hydraulic cylinder, the length of the actuator 186 is adjustable in response to changes in hydraulic pressure. A change in length of the actuator 186 causes rotation of the front portion 174 relative to the back portion 176 about the pivot axis 178. Other types of actuators, such as an actuator that includes an electric motor, could be also used to rotate the front portion 174 relative to the back portion 176.

The front portion 174 of the split side sheet 172 is positioned adjacent the back portion 176 of the split side sheet 172 so that, in a normal harvesting mode of operation, the front portion 174 is in contact with the back portion 176. The split side sheet 172 thus appears as a single piece. The front portion 174 includes a roller opening 192 and a roller opening 194 formed therein at opposing ends thereof. The roller opening 192 receives the driven roller 36 of the pickup belt assembly 20, while the roller opening 194 receives the drive roller 34 of the pickup belt assembly 20. Also included on the front portion 174 of the split side sheet 172 is a bracket 196 by which the front portion 174 is pivotably coupled to the back portion 176 and by which the actuator 186 is coupled to the front portion 174. In some embodiments, the bracket 196 includes a pair of offset plates 198, as shown in FIG. 11. Each of the plates 198 includes an opening 200 positioned so that the openings 200 are aligned with each other. The aligned openings 200 align with the opening 190 formed in the bracket 188 of the back portion 176 of the side sheet 172. The back portion bracket 188 is positioned between the offset plates 198 and arranged such that the openings 200 and 190 align. The pivot pin 192 is received into the aligned openings 200 and 190. The plates 198 of the bracket 196 also include a mounting feature 202 therein (e.g., another pair of aligned openings) by which the actuator 186 is coupled.

The actuator 186 is coupled between the front and back portions 174, 176 of the split side sheet 172 to provide for rotation between the front and back portions 174, 176. Opposing ends of the actuator 186 are coupled to the mount 184 on the back portion 176 and the mounting feature 202 of the bracket 196 on the front portion 174. Alteration of a length of the actuator 186 causes a relative rotation of the front portion 174 relative and the back portion 176 about the pivot axis 178.

As the length of the actuator 186 decreases, the front portion 174 pivots about pivot axis 178 in a direction of arrow 203. In some instances, rotation of the front portion 174 continues until the actuator 186 is fully retracted. In some embodiments, the front portion 174 is rotatable relative to the back portion 176 over a range of approximately 40° to 65°. In some embodiments, the actuator 186 is adjustable between a first position in which the actuator 186 is in a fully extended condition to a second position in which the actuator 186 is in a fully retracted condition.

As shown in FIGS. 12 and 13, rotation of the front portion 174 of the split side sheet about the pivot axis 178 relative to the back portion 176 correspondingly results in rotation of the pickup belt assembly 20 mounted thereto relative to the transfer belt assembly 22. Rotation of the pickup belt assembly 20 in the direction of arrow 203 causes the pickup belt assembly 20 to separate and moved away from the transfer belt assembly 22, thereby forming a discharge zone 204 therebetween. Crop material is dischargeable through the discharge zone 204, such as during operation of the feeder house belt conveyor 62, auger 6, and transfer belt assembly 22 in a declogging mode of operation. Particularly, crop material is discharged through the discharge zone 204 when the belt 40 of the transfer belt assembly 22 is rotated in a reverse rotational direction R.

FIG. 12 illustrates the split side sheet 172 and belt assemblies 20, 22 in a normal harvesting configuration with the actuator 186 in a fully extended position and the belt assemblies 20, 22 angled and arranged relative to one another to space the pickup belt assembly 20 apart from the transfer belt assembly 22 by a distance D1. The separation distance D1 allows of the belts 40 and 42 to rotate in a forward rotational direction F without destructively interfering with each other. Further, rotation of the belts 40 and 42 in the direction F moves crop material from the pickup belt assembly 20, to transfer belt assembly 22, to the auger 6, and to the feeder house 8.

FIG. 13 illustrates the belt assemblies 20, 22 in a discharge configuration. In the discharge configuration, the front portion 174 (and pickup belt assembly 20) is pivoted about the pivot axis 178 in the direction of arrow 203 in response to retraction of the actuator 186, thereby increasing a separation between the pickup belt assembly 20 and the transfer belt assembly 22 to form the discharge zone 204. In some instances, the actuator 186 is fully retracted to define the discharge configuration. In the discharge configuration, a separation distance D3 is formed between the pickup belt assembly 20 and the transfer belt assembly 22. The separation therebetween allows crop material to be discharged through the discharge zone 204. According to some embodiments, the front portion 174 is rotatable about the pivot axis 178 and relative to the back portion 176 over a range of approximately 40° to 65°. In some instances, a range of rotation of the front portion 174 relative to the back portion 176 of approximately 40° to 65° corresponds to a discharge zone width of between approximately 250 mm to 330 mm. In other instances, an amount of rotation of the front portion 174 relative to the back portion 176 may be greater or lesser than the range of 40° to 65° and the distance D3 may be greater or lesser than the range of 250 mm to 330 mm.

Following formation of the discharge zone 204 in response to rotation of the front portion 174 about the pivot axis 178 in the direction of arrow 203, the transfer belt assembly 22 can be operated in declogging mode to remove crop material from the belt pickup header 170. For example, in the declogging mode, the belt 40 is rotated in the reverse rotational direction R, in conjunction with reverse operation of the feeder house belt conveyor 62 and auger 6, to direct crop material through the discharge zone 204, as indicated by arrow 205. Operating the belt pickup header 170 in this way removes crop material that may be forming a clog within the feeder house 8. In some embodiments, the belt 42 of pickup belt assembly 20 may continue to rotate in the forward rotational direction F while the transfer belt assembly 22, feeder house belt conveyor 62, and auger 6 operate in move crop material out through the discharge zone 204. In other instances, the belt 42 of the pickup belt assembly 20 may rotate in a reverse rotational direction, opposite the forward rotational directional F, when pickup belt assembly 20 is in the discharge configuration.

Figure 14:
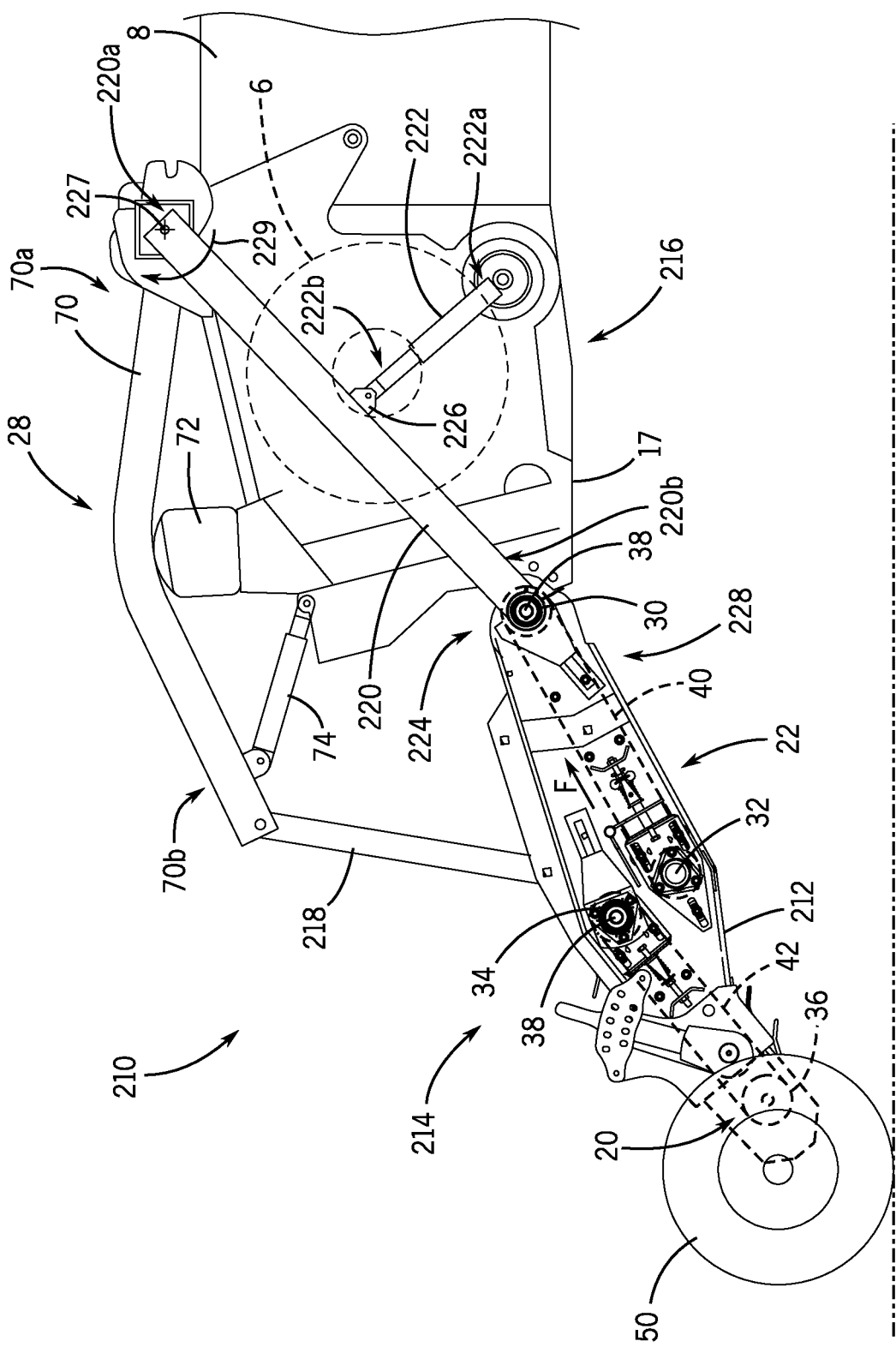
FIG. 14 is a side view of a belt pickup header that includes a separable front section in accordance with another example embodiment and illustrates positioning of the front section relative to a back section while in a normal operating mode.
Figure 15:
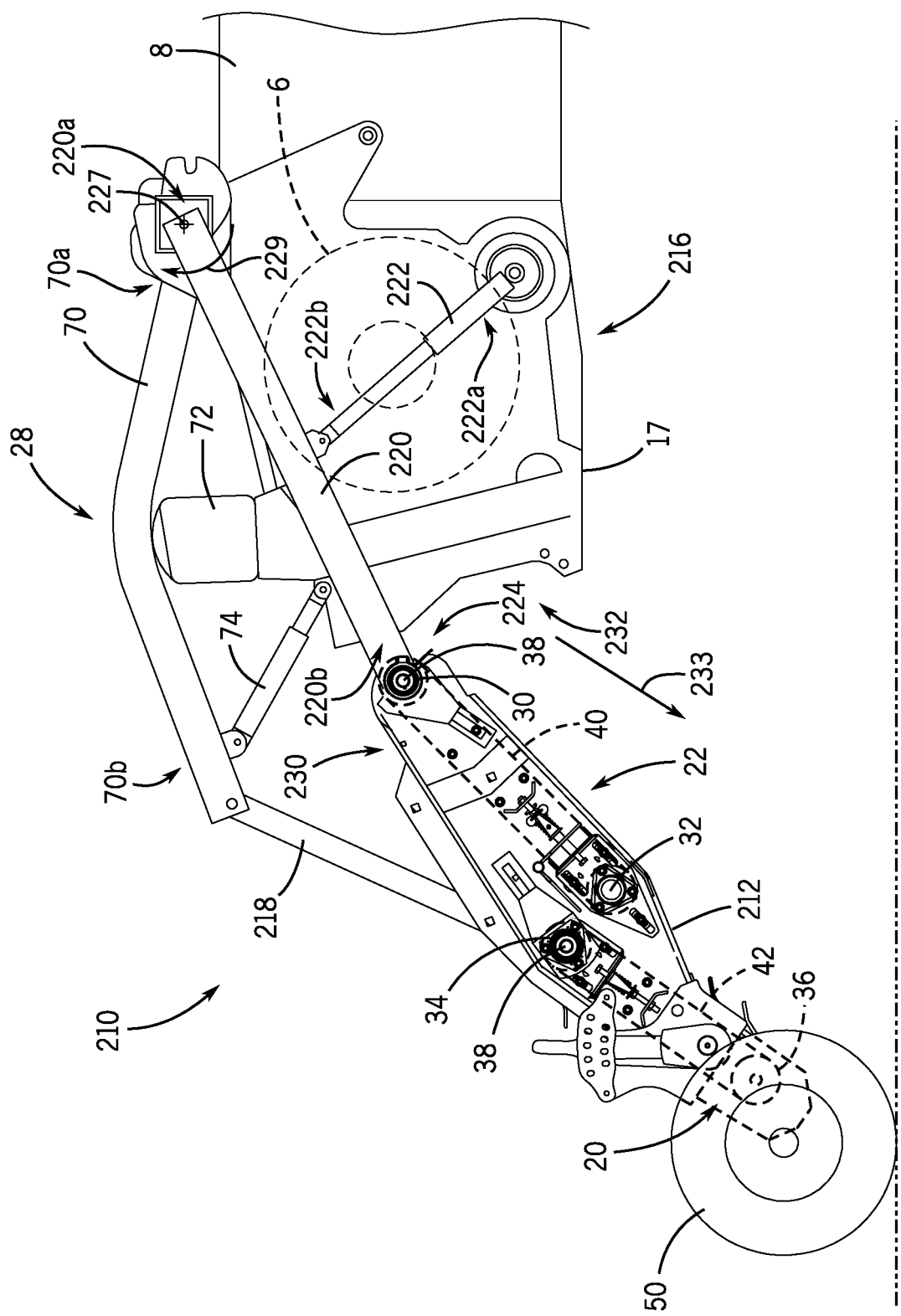
FIG. 15 is a side view of the belt pickup header of FIG. 14 illustrating positioning of the front section relative to a back section while in a feeder house declogging operating mode.

FIGS. 14 and 15 illustrate another example belt pickup header 210. The belt pickup header 210 includes a pickup belt assembly 20 and transfer belt assembly 22 that are separable from an auger 6 and feeder house 8 to provide for the removal of crop material that may be forming an obstruction, such as a clog within the feeder house 8. While only one side of the belt pickup header 210 is shown in FIGS. 14 and 15, it is recognized that the opposing side of the belt pickup header 210 would have a similar structure to that shown in FIGS. 14 and 15.

In the belt pickup header 210, the pickup belt assembly 20 and transfer belt assembly 22 are coupled to a side sheet 212. The side sheet 212 carries the drive roller 30 and driven roller 32 of the transfer belt assembly 22 and the drive roller 34 and driven roller 36 of the pickup belt assembly 20. Drive roller 30 and drive roller 34 are respectively driven by a pair of motors 38 that operate to drive the transfer belt assembly 22 and the pickup belt assembly 20, including causing rotation of the rollers 30, 32 and the belt 40 of the transfer belt assembly 22 and the rollers 34, 36 and belt 42 of the pickup belt assembly 20.

The side sheet 212, pickup belt assembly 20, and transfer belt assembly 22, along with the gauge wheel 50, form a front section 214 of the belt pickup header 210 that is separated from a back section 216 of the header 210. The back section 216 includes a main frame 17, the auger 6, and the feeder house 8. A suspension system 28 couples the front section 214 to the back section 216. The suspension system 28 includes a suspension arm 70, a compression springs 72, and a shock 74 (e.g., a hydraulic shock) that dampens movement between the suspension arm 70 and the main frame 17. The suspension arm 70 has a first end 70*a* that is pivotally coupled with the main frame 17 and a second end 70*b* that is coupled with the side sheet 212. A link 218 couples the second end 70*b* of the suspension arm 70 with the side sheet 212.

As shown in FIGS. 14 and 15, a swing arm 220 and an actuator 222, are included in the belt pickup header 210 that function to vary a position of the front section 214 relative to the back section 216 and, as such, altering a position of the pickup belt assembly 20 and transfer belt assembly 22 relative to the feeder house 8 and the auger 6. In some embodiments, the actuator 222 is a linear actuator, such as a hydraulic cylinder for example. A first end 220*a* of the swing arm 220 is coupled to the main frame 17, while a second end 220*b* of the swing arm 220 is coupled to a back end 224 of the side sheet 212. A first end 222*a* of the actuator 222 is coupled to the main frame 17, while a second end 222*b* of the actuator 222 is coupled to the swing arm 220 at a location along the length thereof (e.g., near a midpoint of the swing arm 220). In some embodiments, the actuator 222 is coupled to the swing arm 220 via a mounting bracket 226, which, in the illustrated embodiment, is a C-bracket.

In operation of the belt pickup header 210, a length of the actuator 222 is adjustable to act on the swing arm 220 and thereby alter a position of the front section 214 relative to the back section 216. More specifically, a shortening or lengthening of the hydraulic cylinder 222 causes a lifting or lowering of the swing arm 220 that, in turn, causes a lifting or lowering of the front section 214 relative to the back section 216. With the actuator 222 in a fully retracted position, as illustrated in FIG. 14, the swing arm 220 is in a lowered position. In some instances, the actuator 222 is lockable in the fully retracted position. The lowered position of the swing arm 220, in turn, causes the front section 214 of the belt pickup header 210 to be in a lowered position 228 relative to the back section 216. In the lowered position 228, the pickup belt assembly 20 and transfer belt assembly 22 are in a normal harvesting configuration where the belts 42, 40 are rotated in a forward rotational direction F and the belt assemblies 20, 22 are positioned and arranged to move crop material toward the auger 6 and feeder house 8.

As the length of the actuator 222 increases, the swing arm 220 pivots about a pivot axis 227 in a direction of arrow 229. With the actuator 222 in a fully extended position, as illustrated in FIG. 15, the swing arm 220 is in a lifted position. The lifted position of the swing arm 220, in turn, causes the front section 214 of the belt pickup header 210 to be in a raised position 230 relative to the back section 216. In the raised position 230, the pickup belt assembly 20 and transfer belt assembly 22 are separated from the main frame 17 to form a discharge zone 232. In some embodiments, the length of the actuator 222 increases by approximately 200 mm from the retracted position to the extended position, with the pickup belt assembly 20 and transfer belt assembly 22 correspondingly separating away from the main frame 17 to form a discharge zone having a width of approximately 350 mm. In other instances, an amount of extension of the actuator 222 may be greater or lesser than 200 mm and the size of the discharge zone 232 may be greater or lesser than 350 mm. With the discharge zone 232 formed in response to extension of the actuator 222 and pivoting of the swing arm 220 in the direction of arrow 229, the feeder house 8 and auger 6 can be operated in declogging mode to remove crop material from the belt pickup header 210. For example, in the declogging mode, the feeder house 8 and auger 6 are operated in reverse to direct crop material through the discharge zone 232, as indicated by arrow 233. Operating the belt pickup header 210 in this way removes crop material that may be forming a clog within the feeder house 8.

Figure 16:
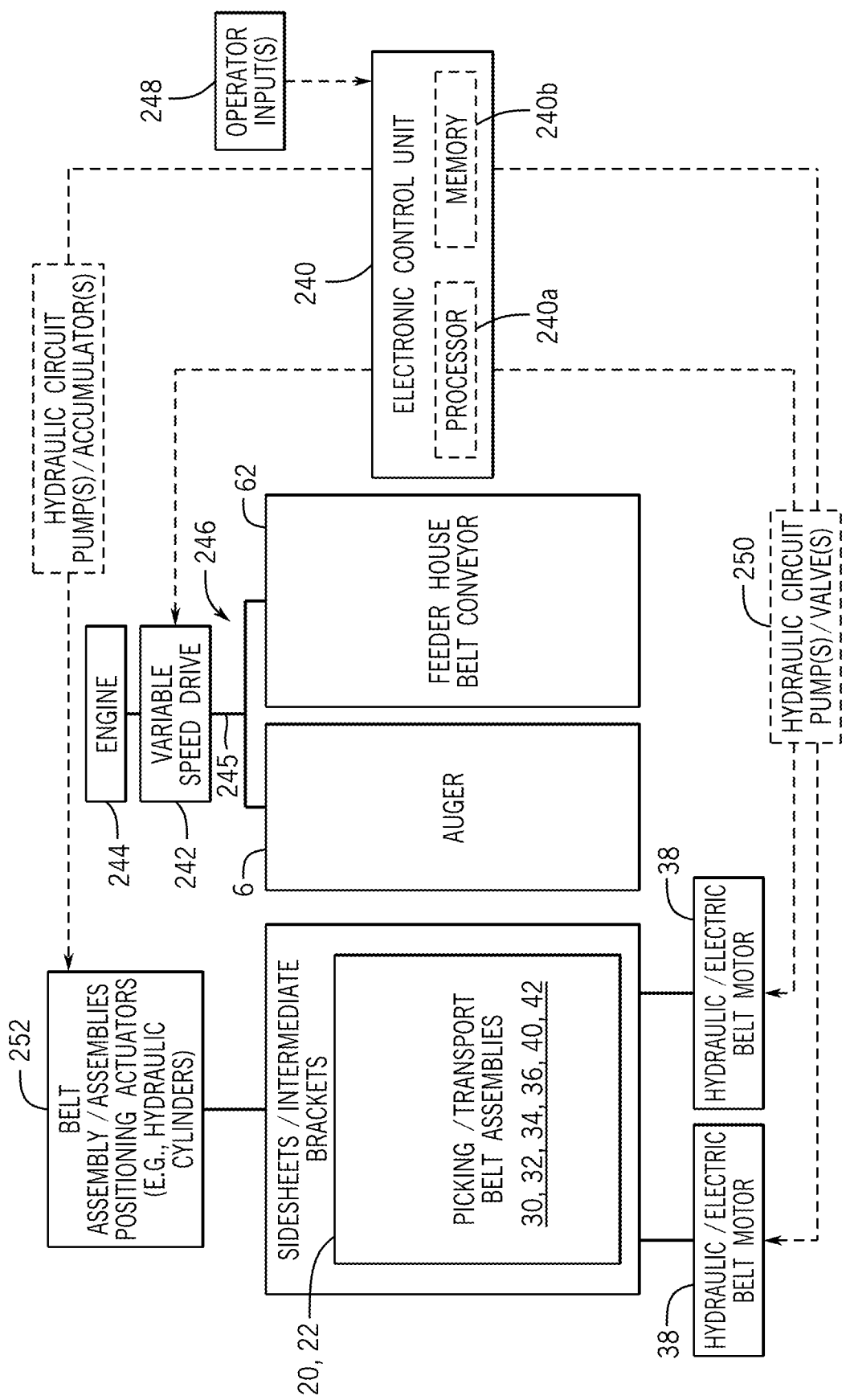
FIG. 16 is a block schematic diagram illustrating a control system for a belt pickup header and feeder house, in accordance with an example embodiment.

In some instances of the belt pickup headers shown and described above in FIGS. 2-15, operation of the pickup belt assembly 20 and transfer belt assembly 22, as well as movement of the pickup belt assembly 20 relative to the transfer belt assembly 22 or movement of the pickup belt assembly 20 and transfer belt assembly 22 relative to the feeder house 8 and auger 6, is controlled by one or more associated hydraulic circuits, electronic circuits, or both included in the combine 2. Additionally, an electronic control unit (ECU) is provided that is operably connected with the one or more associated hydraulic circuits, one or more electronic circuits, or one or more hydraulic circuits and one or more electronic circuits. Referring now to FIG. 16, a schematic diagram is provided that illustrates an ECU 240 in operable communication with various motors, actuators, and drives in a belt pickup header that may be any of the belt pickup headers 12, 132, 170, 210 previously described in FIGS. 2-15. The ECU 240 includes at least one processor 240a and at least one memory 240b to store programmed instructions and working variables for the processor 240a. In the present disclosure, the term "controller" or "electronic control unit" may be replaced with the term "circuit." The term "controller" or "electronic control unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other hardware components that provide the described functionality; or a combination of some or all of the above, such as in a system-on-chip.

As shown in FIG. 16, the ECU 240 is in operable communication with a variable speed drive 242 that operates an auger 6 and a feeder house belt conveyor 62. The variable speed drive 242 may be a gearbox, a continuously variable transmission, or other mechanical or electrical device in which the direction (and, in some instances, a speed) of an output shaft 245 can be varied under the control of ECU 240. An engine 244 (e.g., internal combustion engine) of the combine 2 is drivingly coupled to the variable speed drive 242, such as via a belt and pulley arrangement, with the engine 244 driving an input shaft of the variable speed drive 242. Input power provided by the engine 244 is transformed into an output power, such as via gearing, that drives the output shaft 245 of the variable speed drive 242. The output power is provided to one or more belt and pulley arrangements (generally indicated at 246) connected to the variable speed drive 242 and to the feeder house belt conveyor 62. In some instances, the variable speed drive 242 transfers rotational power to the auger 6, such as an elongate cylinder of the auger 6, and feeder house belt conveyor 62, such as a drive roller 66 of the feeder house belt conveyor 62. The output shaft 245 of the variable speed drive 242 can be selectively engaged, disengaged, driven in a first direction of rotation, driven in a second direction of rotation opposite the first direction of rotation, and driven at a plurality of speeds in both directions, and this operation is controlled by signals received from the ECU 240. The control signals provided from the ECU 240 for operating the variable speed drive 242 (that are, in turn, used to control the speed and direction in which the auger 6 and feeder house belt conveyor 62 are driven) are generated responsive to inputs received by the ECU 240, such as operator inputs 248. The operator inputs 248 are provided, for example, by an operator of the combine 2 via input devices included thereon.

The ECU 240 is also in operable communication with motors 38 that cause rotation of the drive rollers 30, 34 and associated belts 40, 42 of the transfer belt assembly 22 and pickup belt assembly 20. As previously indicated, the motors 38 may be provided as hydraulic motors. However, in other instances, the motors 38 can be other types of motive devices, such as electric motors. Where the motors 38 are provided as hydraulic motors, the ECU 240 controls operation of one or more pump(s) and valve(s) of a hydraulic circuit 250 (shown in phantom) to selectively set and control both the speed and direction of fluid flow through the hydraulic motors 38.

In some embodiments, the hydraulic motors 38 are coupled in a series arrangement by the hydraulic circuit 250 via the pump(s) and valve(s). When coupled in series, both the hydraulic motors 38 move in the same direction (either forward or reverse) and at the same (or proportionate) speeds, such as may be desired for the belt pickup header 4 (FIGS. 2-7). When operating in the same direction and speed, the belts 42, 40 of the belt assemblies 20, 22, respectively, both rotate in a forward rotational direction to move crop material to the auger 6 and feeder house 8 when in a normal harvesting position or both rotate in a reverse rotational direction to move crop material away from the auger 6 and feeder house 8 when in a crop declogging position.

In other embodiments, the hydraulic motors 38 are individually controlled via a hydraulic circuit, such that the hydraulic motors 38 rotate in different directions or move in the same direction (either forward or reverse) and at the same (or proportionate) speeds, such as may be desired for the belt pickup headers 132, 170 (FIGS. 8-10 and 11-13). In some embodiments, the belts 42, 40 of belt assemblies 20, 22, respectively, both rotate in a forward rotational direction to move crop material to the auger 6 and feeder house 8 when in a normal harvesting position. When in a crop declogging configuration, the transfer belt 40 of the transfer belt assembly 22 rotates in a reverse rotational direction and the pickup belt 42 of the pickup belt assembly 20 rotates in a forward rotational direction to move crop material away from the auger 6 and feeder house 8 and move crop material through the gap or passage 168, 204. In still other embodiments, it is contemplated that the hydraulic motors 38 are individually controlled to rotate the pickup belt 42 of the pickup belt assembly 20 in a reverse rotational direction and either to stop rotation of the transfer belt 40 of the transfer belt assembly 22, rotate the transfer belt 40 of the transfer belt assembly 22 in a forward rotational direction, or to rotate the transfer belt 40 of the transfer belt assembly 22 in a reverse rotational direction.

The ECU 240 also controls operation of belt assembly positioning actuators ("positioning actuators") 252 (which may be similar to actuators 114, 162, 186, and 222, described earlier) that function to reposition the pickup belt assembly 20 relative to the transfer belt assembly 22 or reposition the pickup belt assembly 20 and transfer belt assembly 22 relative to the feeder house 8 and auger 6, according to embodiments. The positioning actuators 252 may be provided as hydraulically driven actuators or electrically driven actuators, according to embodiments. The positioning actuators 252 may be provided according to any of the embodiments previously described, including any of the actuators 114 of header 4, the actuators 162 of header 132, the actuators 186 of header 170, or the actuator 222 of header 210. In some embodiments where the positioning actuators 252 are provided as hydraulic cylinders, the ECU 240 controls operation of an associated hydraulic circuit and hydraulic accumulator, such as the hydraulic circuit 250 or another similar hydraulic circuit, to adjust a lifting force of each hydraulic cylinder to selectively cause an extension or retraction of the hydraulic cylinder. The extension and retraction of the hydraulic cylinders repositions the pickup belt assembly 20 relative to the transfer belt assembly 22 or repositions the pickup belt assembly 20 and transfer belt assembly 22 relative to the feeder house 8 and auger 6, as previously described in the example embodiments shown and described in FIGS. 2-15.

According to various embodiments, the ECU 240 controls the motors 38 and the positioning actuators 252 in what are termed herein as either a "manual" mode or an "automated" mode. In a manual mode of operation, the ECU 240 controls the motors 38 and the positioning actuators 252 in direct response to corresponding inputs 248 provided by an operator, such as via input devices on the combine 2. In an automated mode of operation, ECU 240 automatically controls of the motors 38 and the positioning actuators 252 in response to a sensed or detected operation of other components in the combine 2.

As one example of operation in the manual mode, a forward or reverse mode of the motors 38 (and a corresponding forward or reverse rotational direction of movement of the belts 42, 40 in the pickup belt assembly 20 and transfer belt assembly 22) is controlled in response to input commands 248 provided by the operator. As another example of operation in the manual mode, and where the positioning actuators 252 are provided as hydraulic cylinders, an extension or retraction of the hydraulic cylinders 252 (and a corresponding repositioning of the pickup belt assembly 20 relative to the transfer belt assembly 22 or reposition the pickup belt assembly 20 and transfer belt assembly 22 relative to the feeder house 8 and auger 6) is controlled in response to input commands 248 provided by the operator.

As an example of operation in the automated mode, the ECU 240 is able to identify an operating mode (i.e., direction of rotation) of the auger 6 and feeder house belt conveyor, such as feeder house belt conveyor 62, in the belt pickup header and implement an automatic control scheme for the motors 38 and the positioning actuators 252 in response to such identification. In operation of the belt pickup header, the ECU 240 may cause the auger 6 and feeder house belt conveyor 62 to rotate in a reverse rotational direction, such as in response to inputs 248 provided by the operator, such as when desired to address a clogging of crop material in the feeder house 8. When such inputs 248 are received by the ECU 240, and upon the ECU 240 providing commands (to the variable speed drive 242) that cause the auger 6 and feeder house belt conveyor 62 to rotate in the reverse rotational direction, the ECU then automatically generates commands for controlling operation of the motors 38 and the positioning actuators 252. Commands from the ECU 240 may operate the motors 38 to rotate the belts 42, 40 of the pickup belt assembly 20 and transfer belt assembly 22 in a forward or reverse rotational direction, such as operating both the belts 42, 40 in the reverse rotational direction, or operating the belt 40 of the transfer belt assembly 22 in the reverse rotational direction while operating the belt 42 of the pickup belt assembly 20 in the forward rotational direction or stopping rotation of the belt 42, according to embodiments. Commands from the ECU 240 operate the positioning actuators 252 (e.g., hydraulic cylinders) to extend or retract and thereby reposition the pickup belt assembly 20 relative to the transfer belt assembly 22 or reposition the pickup belt assembly 20 and transfer belt assembly 22 relative to the feeder house 8 and auger 6, according to embodiments.

Figure 17:
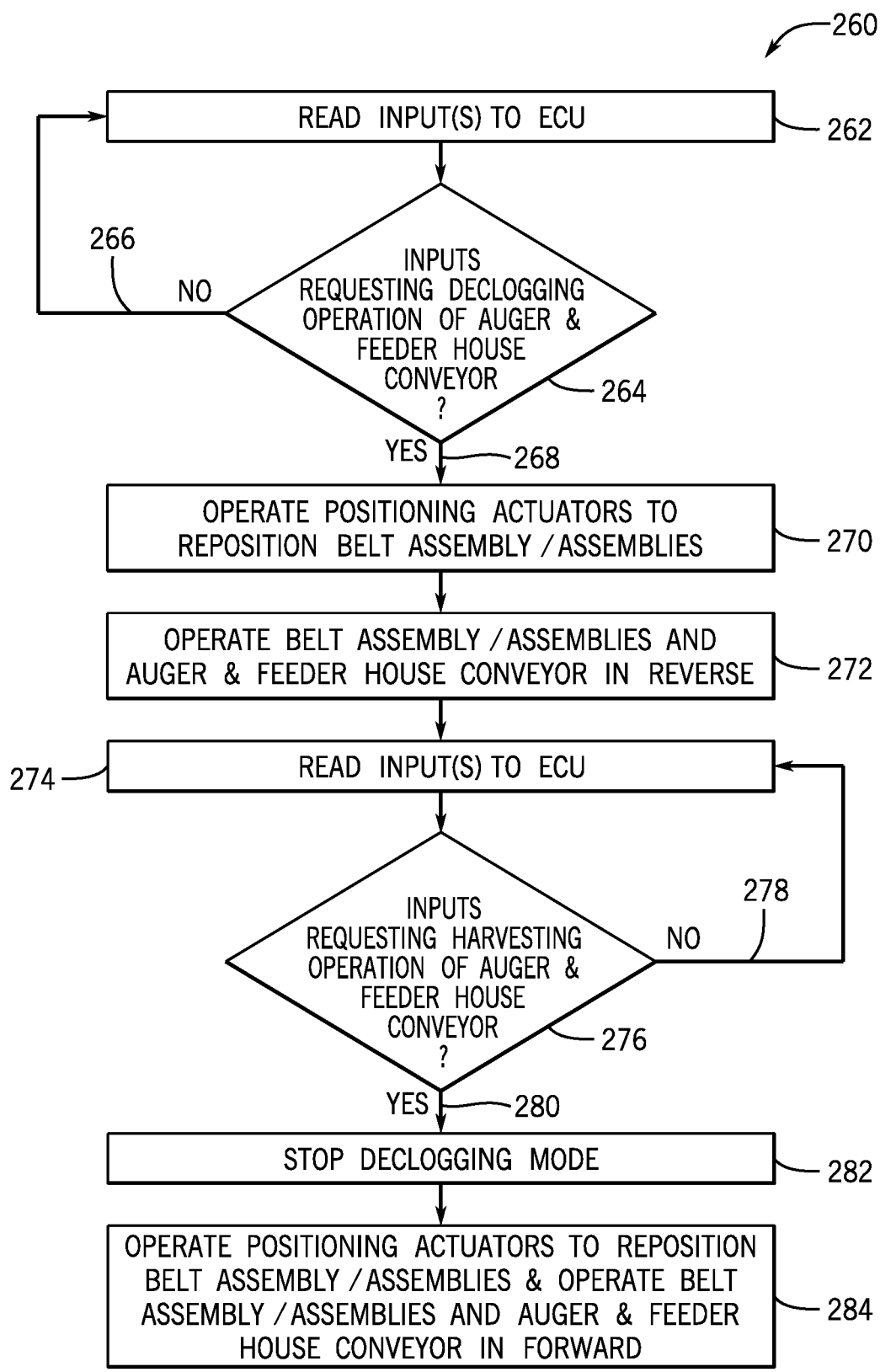
FIG. 17 is a flowchart illustrating a control scheme for operating a belt pickup header, in accordance with an example embodiment.

Referring now to FIG. 17, a control scheme 260 that is implemented by the ECU 240 or another controller is shown. The control scheme 260 is provided as a programmed loop that may be periodically executed when the combine 2 is traveling through a field harvesting crops and may be stored in the form of programming instructions in the memory 240b of the ECU 240. In the illustrated embodiment, the control scheme 260 is initiated such as while the combine 2 is operating in a normal, harvesting mode of operation.

At the start of the control scheme 260, and as indicated at step 262, the ECU 240 reads an input signal 248 such as may be provided from an operator input device included in the cabin 16 of the combine 2.

At step 264, the ECU determines from the input signal 248 whether the operator has requested that the auger 6, feeder house belt conveyor 62, or both be operated in a declogging mode to remove clogged crop material from the feeder house 8.

If the ECU 240 determines that no operator request has been received to operate in the declogging mode, as indicated at 266, the ECU 240 loops back to step 262 and continues to monitor for and read an input signal 248.

Alternatively, if the ECU 240 determines that an operator has requested that the auger 6 and feeder house belt conveyor 62, or a combination thereof be operated in the declogging mode, as indicated at 268, the ECU 240 continues to step 270, where the ECU 240 generates commands to operate the positioning actuators 252 in the belt pickup head, which in one embodiment comprises causing positioning actuators to extend or retract. Operation of the positioning actuators 252 results in a repositioning of one or more of the pickup belt assembly 20 and transfer belt assembly 22, including repositioning the pickup belt assembly 20 relative to the transfer belt assembly 22 or repositioning the pickup belt assembly 20 and transfer belt assembly 22 relative to the feeder house 8 and auger 6, according to embodiments.

Upon repositioning of the pickup belt assembly 20, the transfer belt assembly 22, or both via operation of the positioning actuators 252, the ECU 240 continues to step 272 and generates commands to operate the pickup belt assembly 20, the transfer belt assembly 22, or both, and the auger 6 and the feeder house belt conveyor 62 in a mode for clearing clogged crop material from the feeder house 8. That is, the ECU 240 provides commands (such as to variable speed drive 242) that cause the auger 6 and feeder house belt conveyor 62 to rotate in the reverse rotational direction and also provides commands to the motors 38 to rotate the belts 42, 40 of the pickup belt assembly 20 and transfer belt assembly 22 in a forward or reverse rotational direction as desired. In some embodiments, the motors 38 are operated to drive both the belts 42, 40 in the reverse rotational direction. In other embodiments, the motors 38 are operated to drive the belt 40 of the transfer belt assembly 22 in the reverse rotational direction and drive the belt 42 of the pickup belt assembly 20 in the forward rotational direction or, in still other embodiments, to drive the belt 40 of the transfer belt assembly 22 in the reverse rotational direction and to stop rotation of the drive bel 42 of the pickup belt assembly 20. The specific operation of the motors 38 may be determined according to the specific embodiment of the belt pickup header and the particular manner in which the belt assemblies 20, 22 are repositioned, as previously described in detail for the embodiments of FIGS. 2-15.

The control scheme 260 continues at step 274 with the ECU 240 reading another input signal 248 provided from the operator. At step 276, the ECU determines from the input signal 248 whether the operator has requested that the auger 6 and feeder house belt conveyor 62 be operated in a normal harvesting mode upon removal of clogged crop material from the feeder house 8 (as addressed by the previous operation in declogging mode).

If the ECU 240 determines that no operator request has been received for the auger 6 and feeder house belt conveyor 62 to operate in harvesting mode, as indicated at 278, the ECU 240 loops back to step 274 and continues to monitor for and read an input signal 248. At step 274, the auger 6 and feeder house belt conveyor 62 continue to rotate 23 in the reverse rotational direction and the belts 42, 40 of the pickup belt assembly 20 and transfer belt assembly 22 continue to rotate in a forward or reverse rotational direction (based on the particular belt pickup head) as previously described.

Alternatively, if the ECU 240 determines that an operator has requested that the auger 6 and feeder house belt conveyor 62 be operated in a harvesting mode, as indicated at 280, the ECU 240 continues to step 282, where the ECU 240 generates commands to stop the declogging mode of operation of the auger 6 and feeder house belt conveyor 62 and the declogging mode of operation of any of the belts 42, 40 of the pickup belt assembly 20 and transfer belt assembly 22.

Subsequent to the declogging mode of operation being terminated and any reverse rotation of the components stopping, the ECU 240 continues at step 284 by generating commands to operate the positioning actuators 252 to reposition one or both of the pickup belt assembly 20 and transfer belt assembly 22 (depending on the belt pickup head embodiment) and by generating commands to operate the belt assemblies 20, 22 and auger 6 and feeder house belt conveyor 62 in a harvesting mode for harvesting crop. According to embodiments, the order in which repositioning of the belt assemblies 20, 22 versus resumption of forward rotational operation of the belt assemblies 20, 22, auger 6, and feeder house belt conveyor 62 in harvesting mode occurs may vary. That is, in some embodiments, the positioning actuators 252 are first operated to reposition one or both of the pickup belt assembly 20 and transfer belt assembly 22 (depending on the belt pickup head embodiment) prior to operating the motors 38 and variable speed drive 242 to drive the belt assemblies 20, 22 and auger 6 and feeder house belt conveyor 62 in the harvesting mode. In other embodiments, the motors 38 and variable speed drive 242 are first operated to drive the belt assemblies 20, 22 and auger 6 and feeder house belt conveyor 62 in the harvesting mode prior to operating the positioning actuators 252 to reposition one or both of the pickup belt assembly 20 and transfer belt assembly 22 (depending on the belt pickup head embodiment). In still other embodiments, the motors 38 and variable speed drive 242 are operated to drive the belt assemblies 20, 22 and auger 6 and feeder house belt conveyor 62 in the harvesting mode at the same time that the positioning actuators 252 reposition one or both of the pickup belt assembly 20 and transfer belt assembly 22 (depending on the belt pickup head embodiment), i.e., simultaneous operation.

Upon completion of step 282, the combine 2 is again ready to begin harvesting crop material, and the control scheme 260 may be looped back and performed again during ongoing operation of the combine 2.

In other embodiments, the control scheme 260 shown and described in FIG. 17 may be implemented in an automated fashion rather than responsive to receiving operator inputs. That is, at steps 262 and 264 for example, instead of reading operator inputs and determining from those inputs whether the operator has requested a declogging mode of operation, the control scheme 260 may instead monitor one or more operational parameters in the combine 2 or the header 4 to determine from those inputs whether the declogging mode of operation should be initiated. In some embodiments, the ECU 240 functions to monitor operation of the variable speed drive 242 that operates the feeder house belt conveyor 62 (and optionally the auger 6). Via inputs received from one or more sensors that monitor operation of the variable speed drive 242, the ECU 240 determines a speed, torque, or both speed and torque, of the variable speed drive 242. If it is determined that the speed or torque of the variable speed drive 242 is outside of a normal operating range, such as the speed being below a normal operating range or the torque being above a normal operating range, the ECU 240 determines that a clog is present in the auger 6 or the feeder house 8. Upon such a determination, the ECU 240 then automatically initiates operation of the auger 6, feeder house belt conveyor 62, or both in a declogging mode to remove clogged crop material from the feeder house 8. Following the automatic detection of a clog and change-over from the harvesting mode to the declogging mode as described above, the control scheme 260 would then continue as shown and described in FIG. 17.

CONCLUSION

There has been provided a belt pickup header arrangement for a harvesting machine, where the position of one or more belt assemblies in the header can be selectively controlled to address issues of crop clogging in the feeder house. The position of a pickup belt assembly in the header may be adjusted relative to a transfer belt assembly to create a clearance therebetween. In some embodiments, this clearance allows for the belt assemblies to be selectively operated in a reverse mode that facilitates removal of clogged crop material from the feeder house when operated in conjunction with the auger and feeder house belt conveyor in reverse. In other embodiments, the clearance created by the positional adjustment of the pickup belt assembly relative to the transfer belt assembly may be of such an amount that a passage is provided between the pickup belt assembly and transfer belt assembly through which clogged crop material may be expelled with the auger and feeder house belt conveyor operating in reverse. In still other embodiments, both the pickup belt assembly and transfer belt assembly in the header may be repositioned relative to the feeder house and auger in order to provide a passage between the belt assemblies and the feeder house and auger through which clogged crop material may be expelled with the auger and feeder house belt conveyor operating in reverse. Operation of the belt assemblies, including controlling both the rotational direction of the belt assemblies and the repositioning of one or more of the assemblies, may be performed manually or may be automatically tied to activation of the feeder house conveyor and auger in reverse so that crop clogging could be quickly and efficiently addressed without affecting normal operation of the header during harvesting.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A header for an agricultural work vehicle that includes a feeder house, the header operable to move crop material in a forward feed direction during a crop processing operation and in a reverse feed direction during a declogging operation, the header comprising:
   a frame configured to be coupled to the feeder house;
   a pickup belt assembly coupled to the frame and including a drive roller and a driven roller about which rotates a pickup belt configured to convey crop material;
   a transfer belt assembly coupled to the frame and including a movable transfer belt arranged to convey crop material from the pickup belt assembly to the feeder house in the forward feed direction;
   an actuator coupled to the frame that pivots the pickup belt assembly relative to the frame about a pivot axis between a first position and a second position to alter an orientation of the pickup belt assembly relative to the transfer belt assembly, wherein the pivot axis is co-axially aligned with a rotation axis of the drive roller or the driven roller; and
   a discharge zone through which crop material is conveyed in the reverse feed direction during the declogging operation.

2. The header of claim 1, wherein the pivot axis is co-axially aligned with the rotation axis of the driven roller.

3. The header of claim 1, wherein the actuator pivots the pickup belt assembly to the second position to form a clearance gap between the pickup belt assembly and the transfer belt assembly; and
   wherein, with the pickup belt assembly in the second position, the pickup belt and the transfer belt are rotated in a reverse rotational direction that is operable to move crop material in the reverse feed direction, with the clearance gap preventing contact of the pickup belt with the transfer belt during rotation of the pickup belt and the transfer belt in the reverse rotational direction.

4. The header of claim 3, wherein the discharge zone is located above the pickup belt, with rotation of the pickup belt and the transfer belt in the reverse rotational direction operable to move crop material in the reverse feed direction, over the transfer belt, and onto and over the pickup belt through the discharge zone.

5. The header of claim 1, wherein, with the pickup belt assembly in the second position, the discharge zone is positioned between the pickup belt assembly and the transfer belt assembly; and
   wherein, with the pickup belt assembly in the second position, the transfer belt is rotated in a reverse rotational direction that moves crop material away from the feeder house and the pickup belt is rotated in a forward rotational direction opposite the reverse rotational direction, with the transfer belt and the pickup belt cooperating to cause crop material to be discharged through the discharge zone.

6. The header of claim 5, wherein rotation of the transfer belt in the reverse rotational direction and rotation of the pickup belt in the forward rotational direction is operable to move crop material in the reverse feed direction, over the transfer belt, and out through the discharge zone between the pickup belt assembly and the transfer belt assembly.

7. The header of claim 1, further comprising an electronic control unit (ECU) operably connected to the actuator and to the transfer belt assembly and the pickup belt assembly, the ECU configured to selectively operate the header in a harvesting mode of operation and a declogging mode of operation;
   wherein, in operating the header in the harvesting mode of operation and the declogging mode of operation, the ECU is configured to:
      receive an input command to cause the header to switch operation from the harvesting mode of operation to the declogging mode of operation;
      upon receiving the input command, cause the actuator to pivot the pickup belt assembly about the pivot axis from the first position to the second position; and
      upon receiving the input command, cause either the transfer belt or both the pickup belt and the transfer belt to rotate in a reverse rotational direction to move crop material in the reverse feed direction.

8. The header of claim 1, wherein the frame comprises a main frame and a pair of side frames, with each side frame of the pair of side frames comprising:

a side sheet to which the transfer belt assembly is mounted; and an intermediate bracket to which is mounted the pickup belt assembly;

wherein the intermediate bracket is rotatable about the pivot axis and relative to the side sheet to change the orientation of the pickup belt assembly relative to the transfer belt assembly.

9. The header of claim 8, wherein the actuator comprises a pair of linear actuators, with a respective linear actuator coupled to a respective side frame of the pair of side frames and with each linear actuator having a first end mounted to the side sheet and a second end mounted to the intermediate bracket; and wherein each linear actuator is actuatable between an extended position and a retracted position to rotate the intermediate bracket relative to the side sheet and thereby provide a corresponding change in the orientation of the pickup belt assembly relative to the transfer belt assembly.

10. The header of claim 1, wherein the frame comprises a main frame and a side sheet, with the pickup belt assembly and the transfer belt assembly attached to the side sheet; and wherein the actuator is configured to collectively pivot both the pickup belt assembly and the transfer belt assembly relative to the main frame, with the discharge zone formed between the transfer belt assembly and the main frame upon separation of the pickup belt assembly and the transfer belt assembly away from the main frame.

11. The header of claim 10, wherein the header further comprises a swing arm having a first end attached to the main frame and a second end attached to the side sheet, the actuator actuatable between an extended position and a retracted position to move the swing arm and thereby cause the pickup belt assembly and the transfer belt assembly to pivot relative to the main frame to form the discharge zone between the transfer belt assembly and the main frame.

12. An agricultural work vehicle comprising:
a feeder house operable to move crop material in a forward feed direction during a crop processing operation and in a reverse feed direction during a declogging operation; and
a header including:
a frame configured to be coupled to the feeder house;
a pickup belt assembly coupled to the frame and including a drive roller and a driven roller about which rotates a pickup belt configured to convey crop material;
a transfer belt assembly coupled to the frame and including a movable transfer belt arranged to convey crop material from the pickup belt assembly to the feeder house;
an actuator coupled to the frame that pivots the pickup belt assembly relative to the frame about a pivot axis between a first position and a second position to alter an orientation of the pickup belt assembly relative to the transfer belt assembly, wherein the pivot axis is co-axially aligned with a rotation axis of the drive roller or the driven roller; and
a discharge zone through which crop material is conveyed from the feeder house in the reverse feed direction during the declogging operation.

13. The agricultural work vehicle of claim 12, wherein the actuator pivots the pickup belt assembly to the second position to form a clearance gap between the pickup belt assembly and the transfer belt assembly; and wherein, with the pickup belt assembly in the second position, the pickup belt assembly and the transfer belt assembly rotate in a reverse rotational direction that moves crop material in the reverse feed direction, with the clearance gap preventing contact of the pickup belt assembly with the transfer belt assembly during rotation of the pickup belt assembly and the transfer belt assembly in the reverse rotational direction.

14. The agricultural work vehicle of claim 13, wherein the discharge zone is located above the pickup belt, with rotation of the pickup belt assembly and the transfer belt assembly in the reverse rotational direction moving crop material in the reverse feed direction, over the transfer belt, and onto and over the pickup belt through the discharge zone.

15. The agricultural work vehicle of claim 12, wherein, with the pickup belt assembly in the second position, the discharge zone is positioned between the pickup belt assembly and the transfer belt assembly; and wherein, with the pickup belt assembly in the second position, the transfer belt assembly rotates in a reverse rotational direction that moves crop material away from the feeder house and the pickup belt assembly rotates in a forward rotational direction opposite the reverse rotational direction, with the transfer belt assembly and the pickup belt assembly cooperating to cause crop material to be discharged through the discharge zone.

16. The agricultural work vehicle of claim 12, wherein the frame comprises a main frame and a side sheet, with the pickup belt assembly and the transfer belt assembly attached to the side sheet, and wherein the actuator is configured to collectively pivot both the pickup belt assembly and the transfer belt assembly relative to the main frame, with the discharge zone formed between the transfer belt assembly and the main frame upon separation of the pickup belt assembly and the transfer belt assembly away from the main frame.

17. The agricultural work vehicle of claim 12, wherein the pivot axis is co-axially aligned with the rotation axis of the driven roller.

\* \* \* \* \*